United States Patent [19]
Miyazaki et al.

[11] 3,874,223
[45] Apr. 1, 1975

[54] LIQUID DETECTOR

[75] Inventors: Ken Miyazaki; Toshitaka Terai; Kazutoshi Takahashi, all of Yokohama; Hiroshi Sato, Kawasaki, all of Japan

[73] Assignee: Asahi Kasei Kogyo Kabushiki Kaishia, Osaka, Japan

[22] Filed: Mar. 30, 1973

[21] Appl. No.: 346,426

[30] Foreign Application Priority Data
Oct. 14, 1972 Japan............................ 47-103410

[52] U.S. Cl.................... 73/32 R, 73/49.1, 73/53, 73/308, 340/236, 340/244 A
[51] Int. Cl........................ G01n 9/00, G01m 3/08
[58] Field of Search............ 73/32 R, 448, 451, 453, 73/322.5, 312, 305, 308, 40, 49.1, 316; 340/224, 236, 244 A; 200/84 R; 324/65 R

[56] References Cited
UNITED STATES PATENTS

| | | | |
|---|---|---|---|
| 479,482 | 7/1892 | Wright................................ | 73/307 |
| 2,004,421 | 6/1935 | Smulski......................... | 73/312 UX |
| 2,161,441 | 6/1939 | Vickers.......................... | 73/322.5 X |
| 2,320,720 | 6/1943 | Croft.................................. | 73/452 |
| 2,634,608 | 4/1953 | Sorber ................................. | 73/305 |
| 3,152,572 | 10/1964 | Allhoff................................ | 73/305 |
| 3,155,792 | 11/1964 | Werts............................ | 73/308 UX |
| 3,326,042 | 6/1967 | Ross et al. ......................... | 73/305 X |
| 3,388,587 | 6/1968 | Hara et al............................... | 73/40 |
| 3,415,268 | 12/1968 | Tweed .............................. | 73/316 X |
| 3,428,074 | 2/1969 | Perrin................................. | 73/32 X |
| 3,603,952 | 9/1971 | Smith................................. | 340/224 |
| 3,675,614 | 7/1972 | Ward et al. ....................... | 73/307 X |
| 3,719,936 | 3/1973 | Daniels et al. ................... | 340/224 X |
| 3,721,898 | 3/1973 | Dragoumis et al............... | 73/49.1 X |
| 3,721,970 | 3/1973 | Niemoth .......................... | 73/49.1 X |
| 3,733,594 | 5/1973 | Orth.................................. | 73/453 X |

*Primary Examiner*—Richard C. Queisser
*Assistant Examiner*—Stephen A. Kreitman
*Attorney, Agent, or Firm*—Cooper, Dunham, Clark, Griffin & Moran

[57] ABSTRACT

A detector element is provided which is responsive to contact with a liquid to be detected to assume at least one of dissolution, softening, shrinkage and absorption conditions to result in a change in its apparent specific gravity. Upon change in the apparent specific gravity of the detector element, a rotation or movement of the element itself or another body or a cut-off of the detector element by dissolution occurs to cause electrical, mechanical or fluidic signal generating means to operate for providing an indication of the liquid to be detected.

30 Claims, 79 Drawing Figures

FIG_1

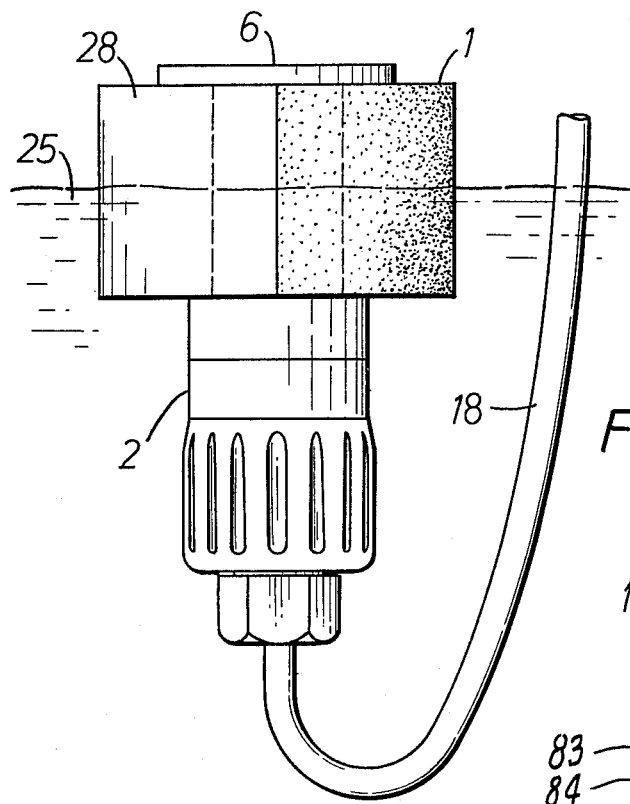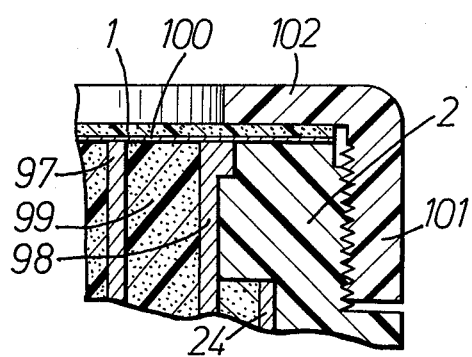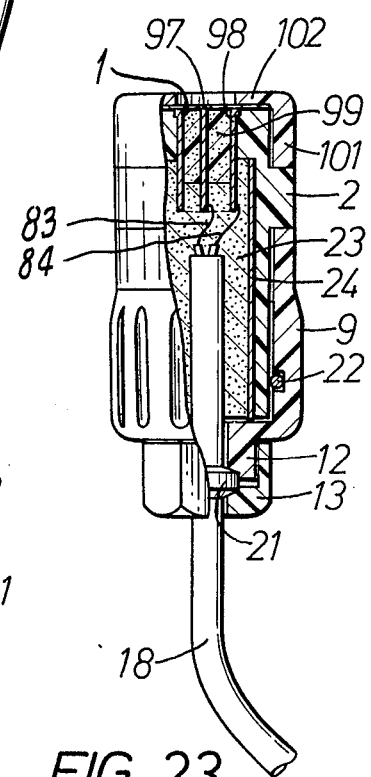
FIG. 2
FIG. 23A
FIG. 23

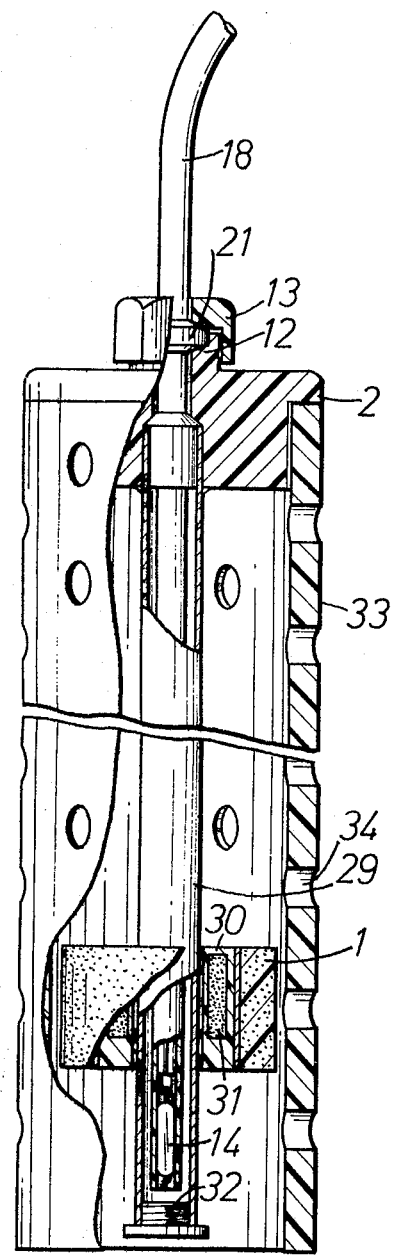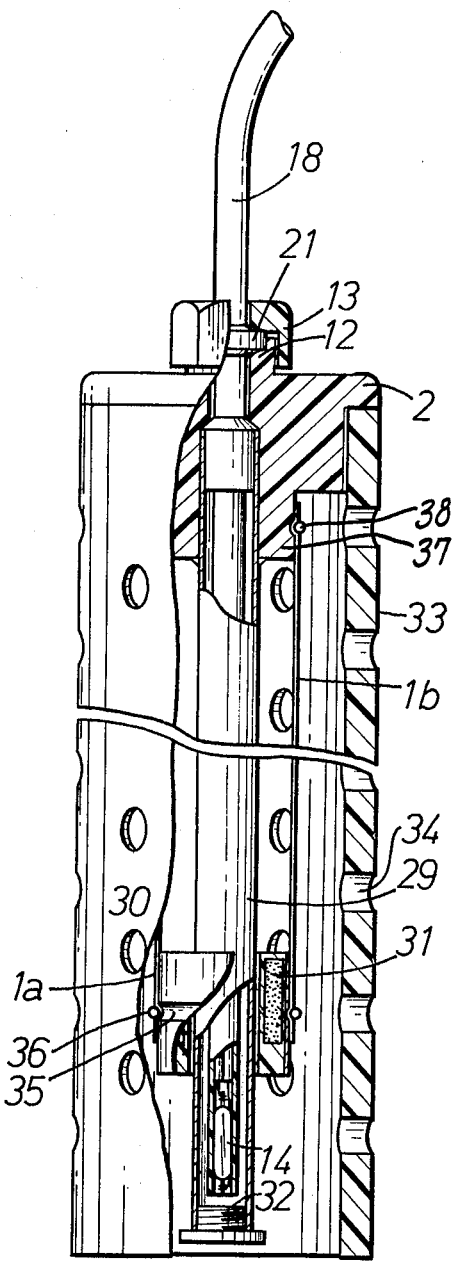
FIG_3    FIG_4

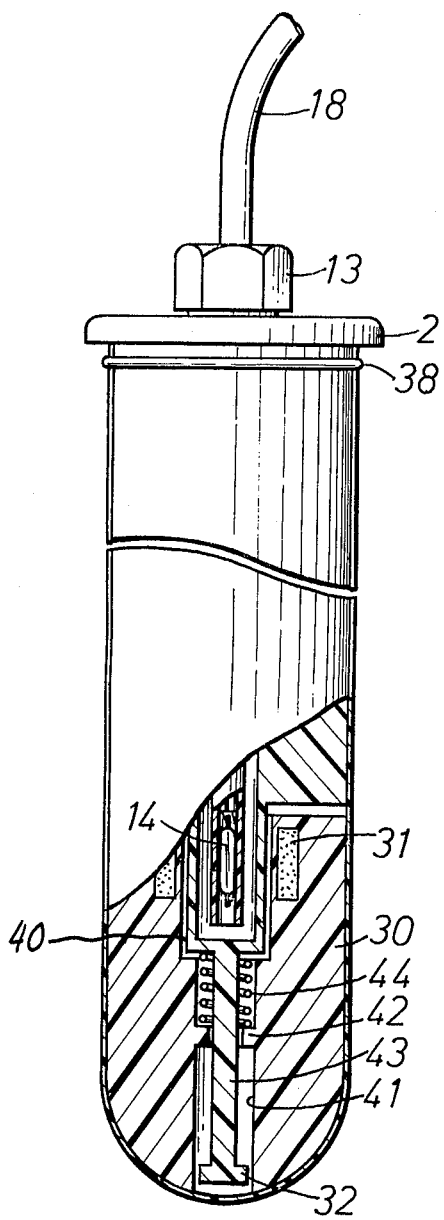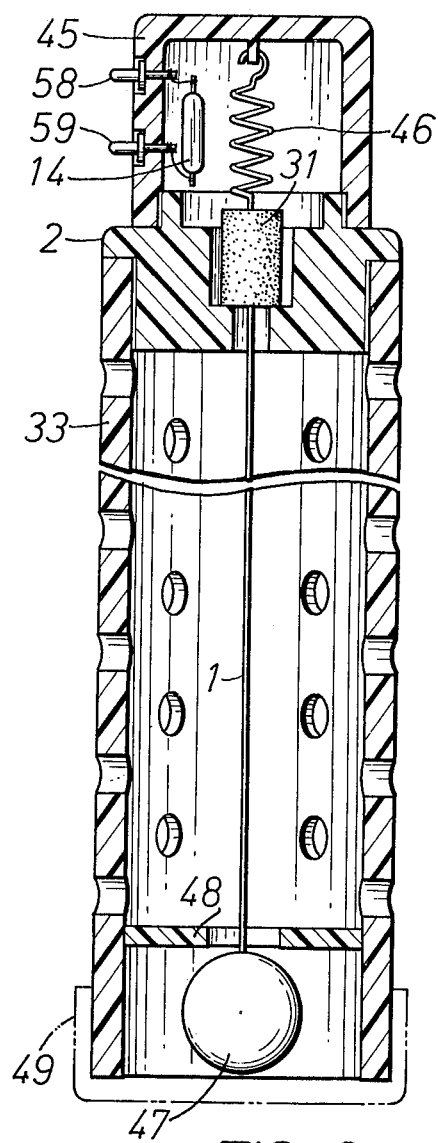
FIG_5  FIG_6

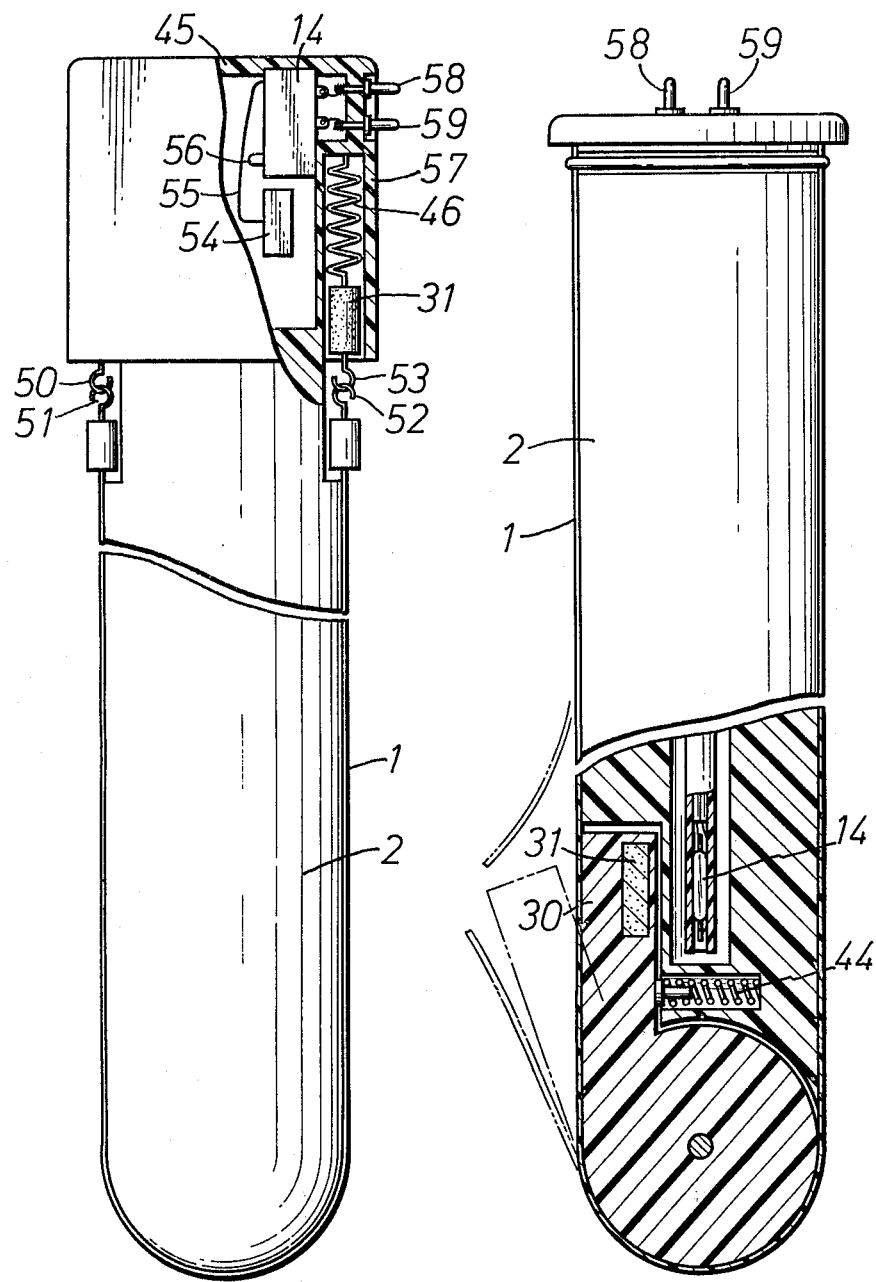

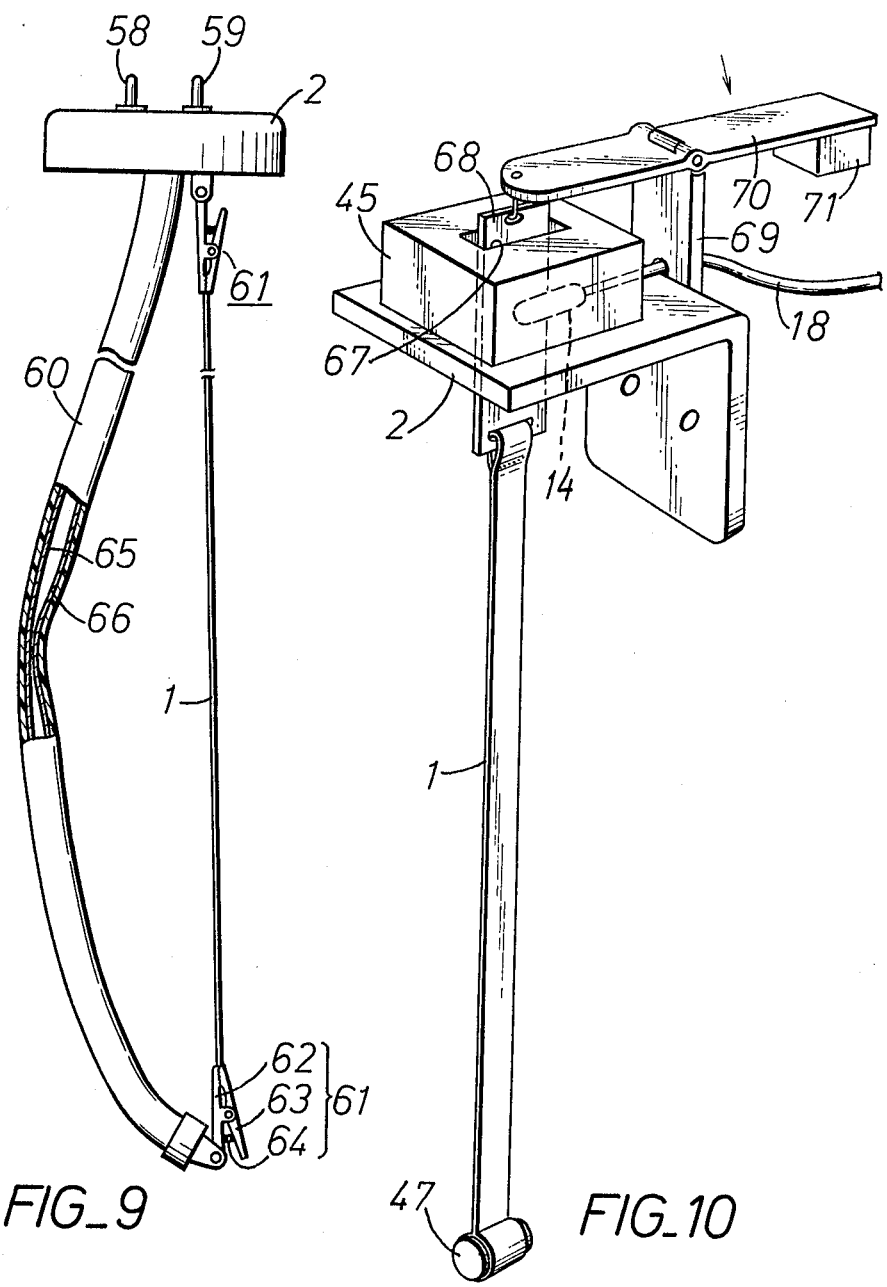

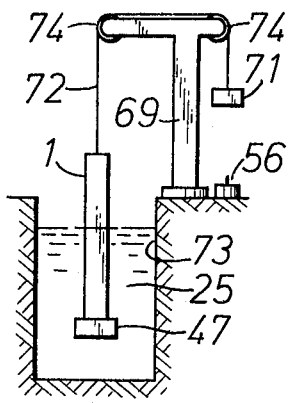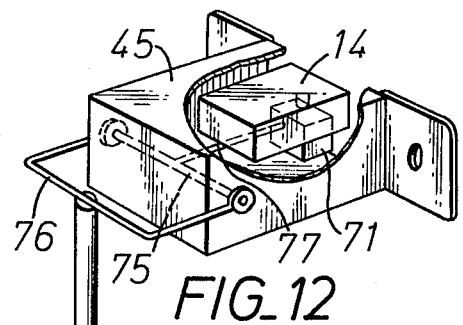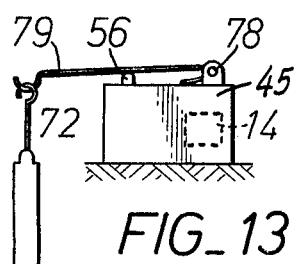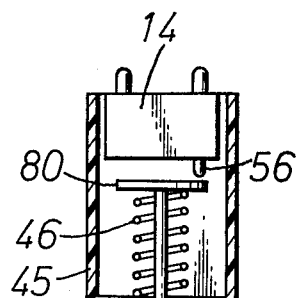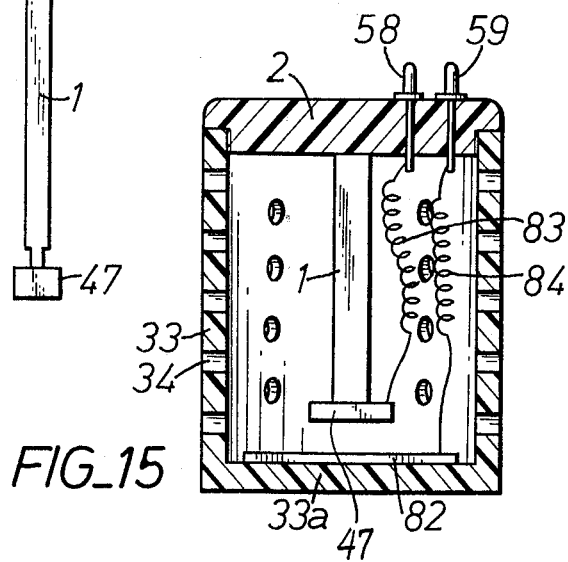

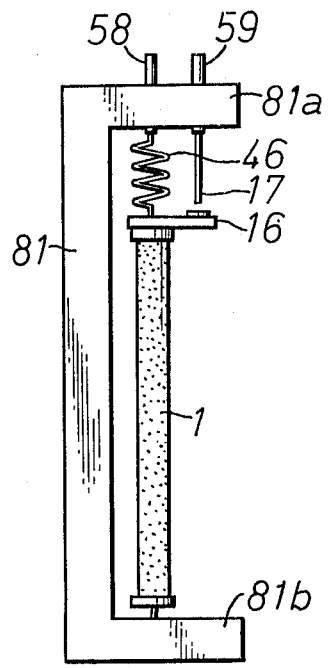
FIG_16
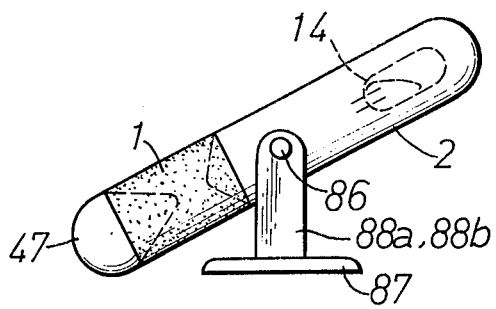
FIG_17
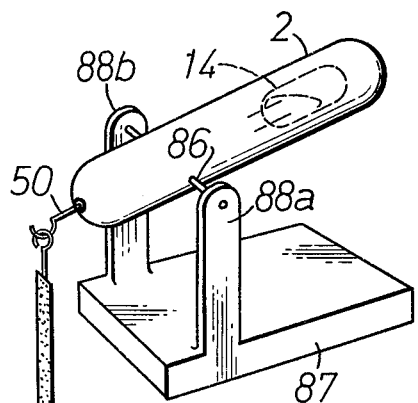
FIG_18
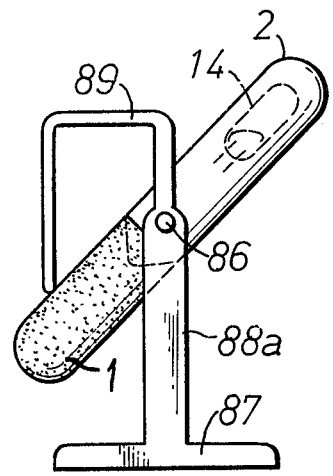
FIG_19
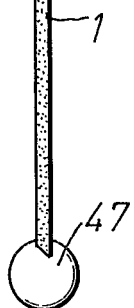

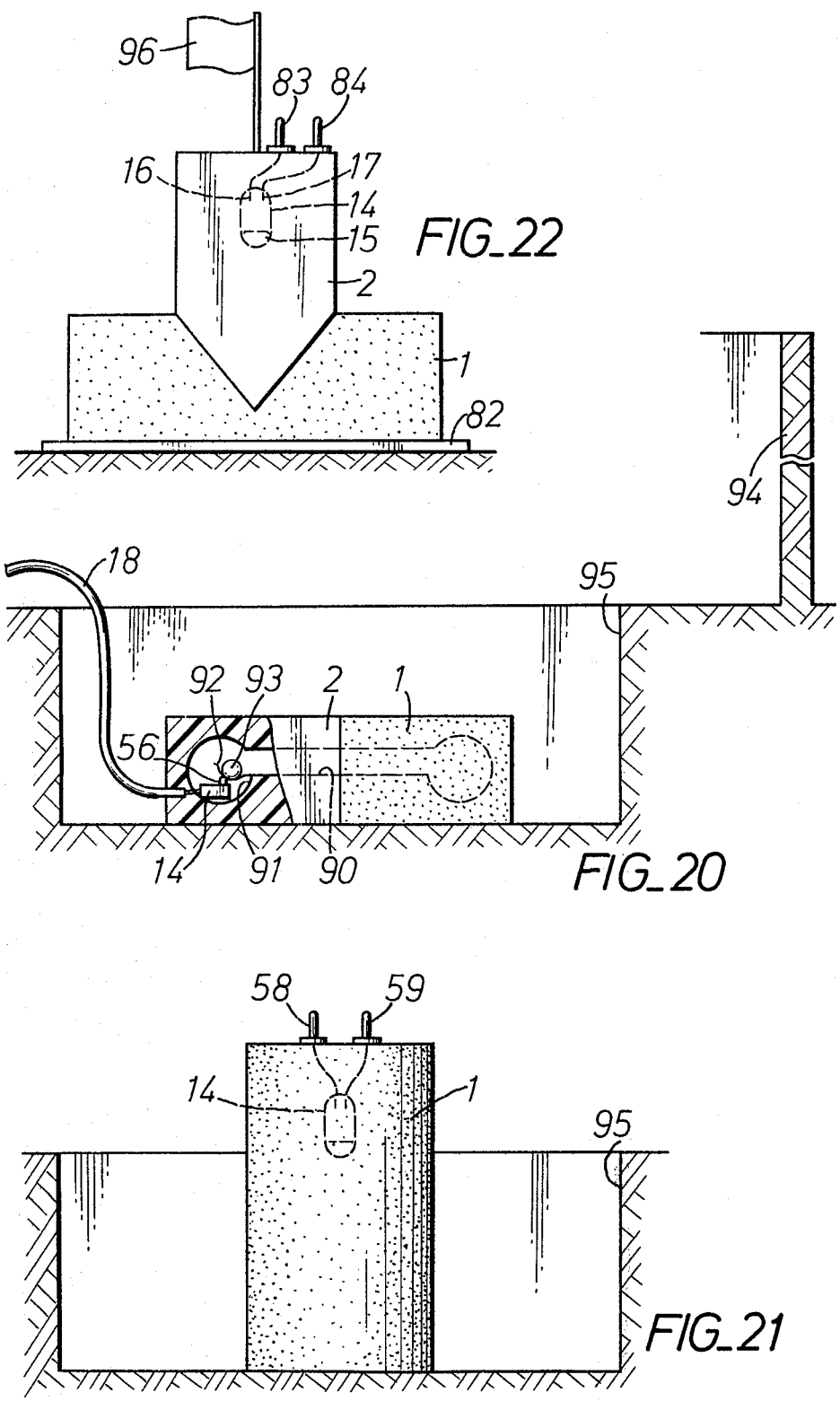

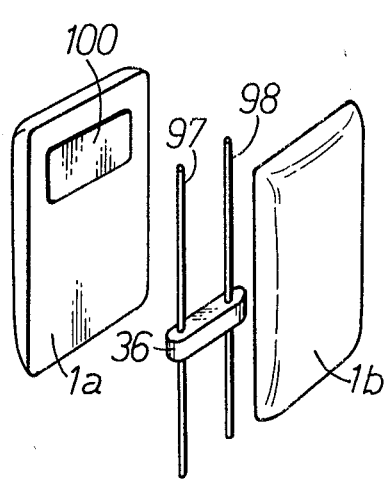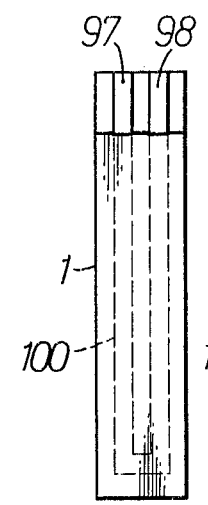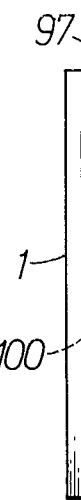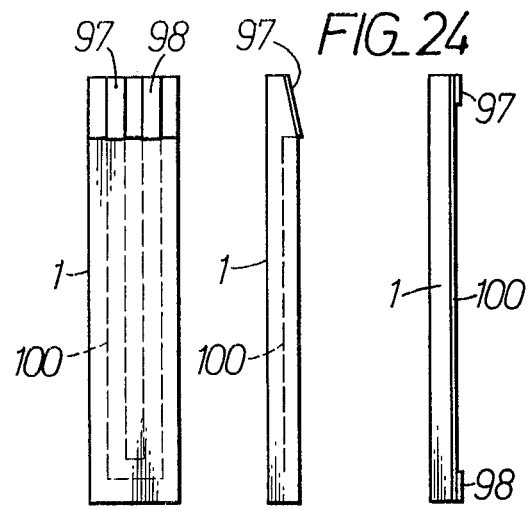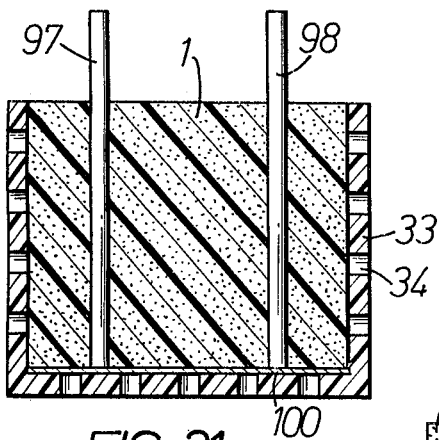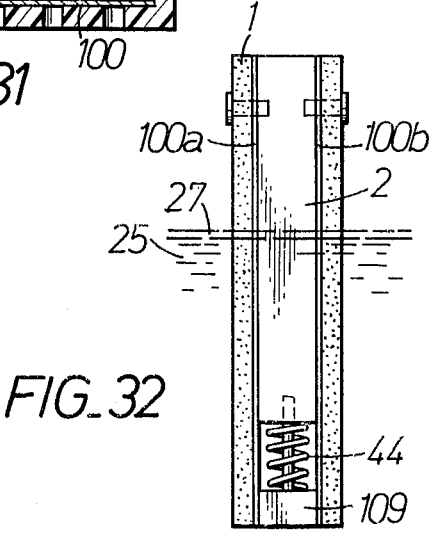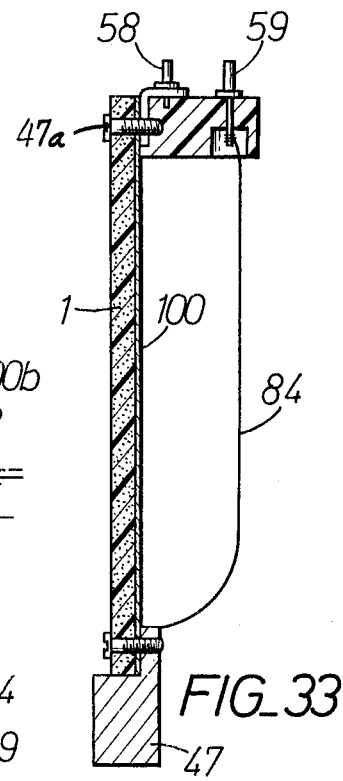

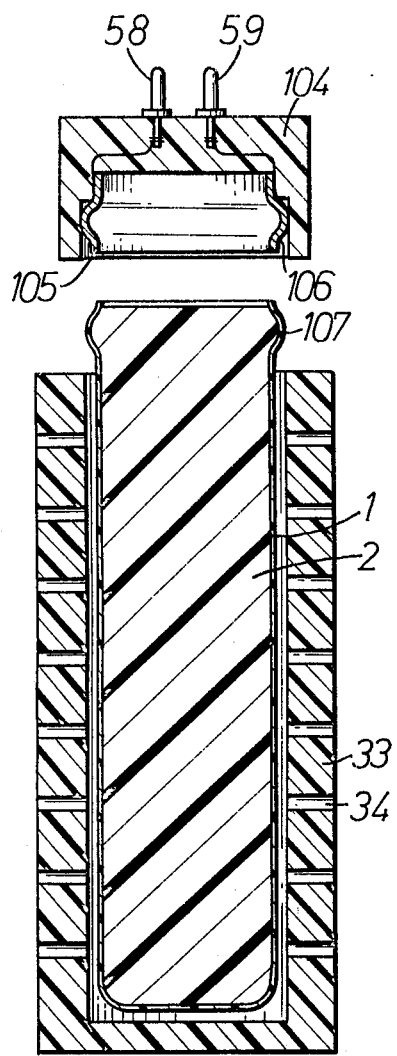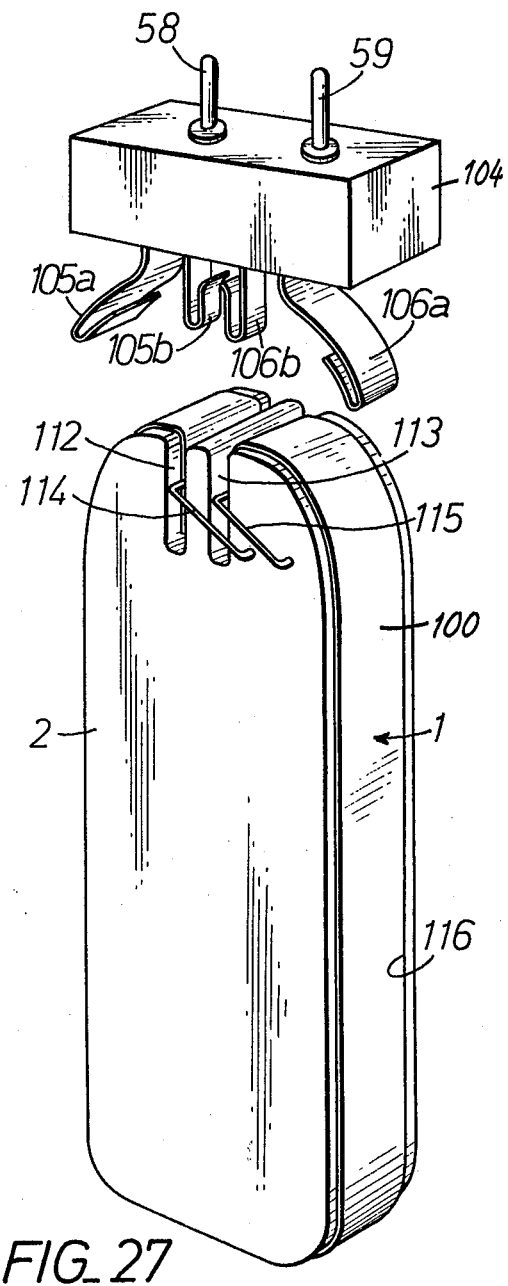
FIG_25
FIG_27

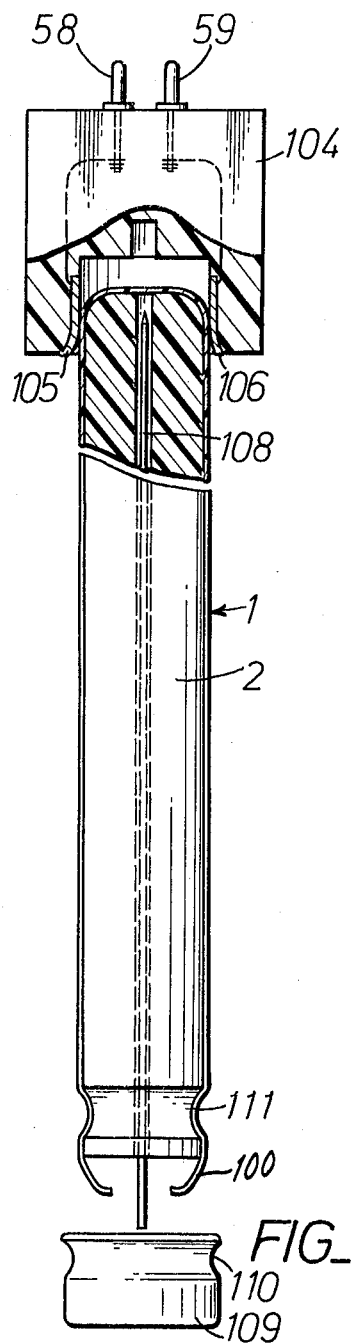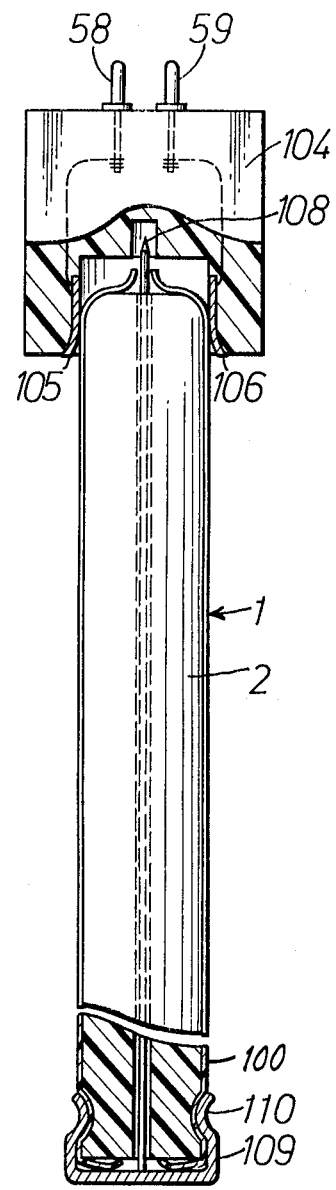
FIG_26A  FIG_26B

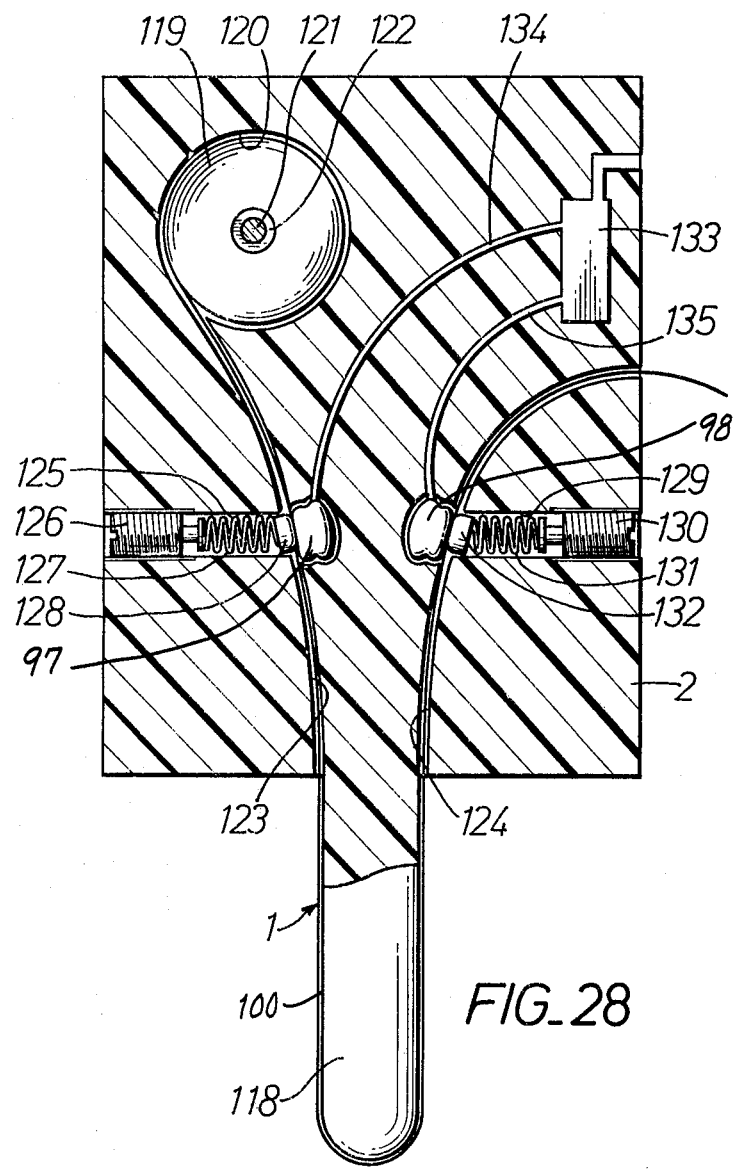
FIG_28

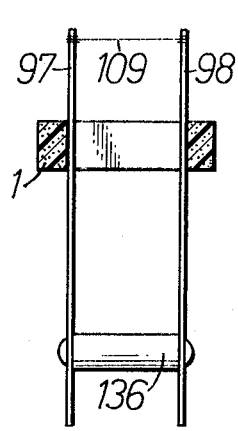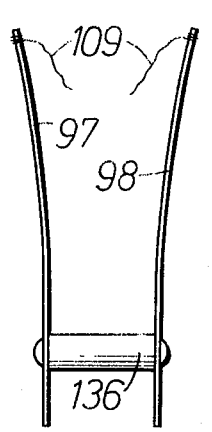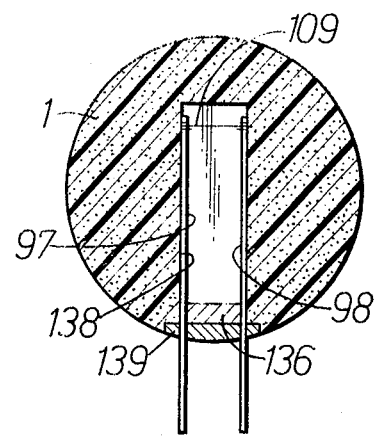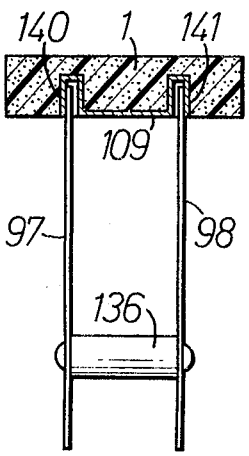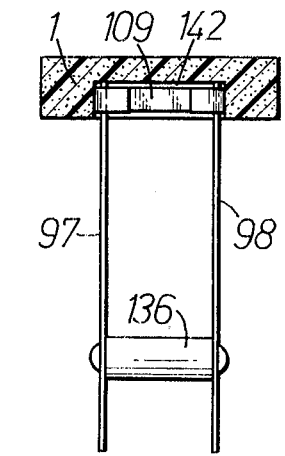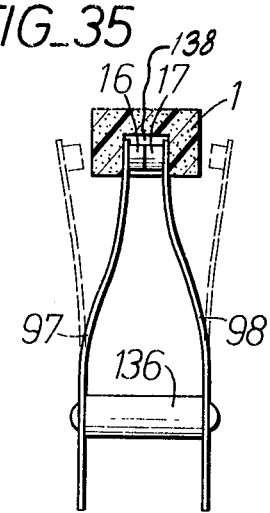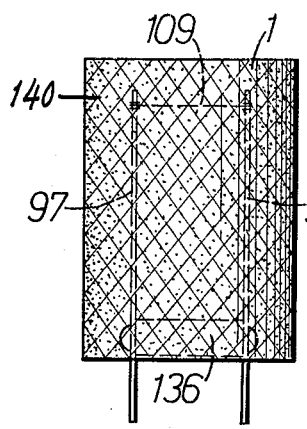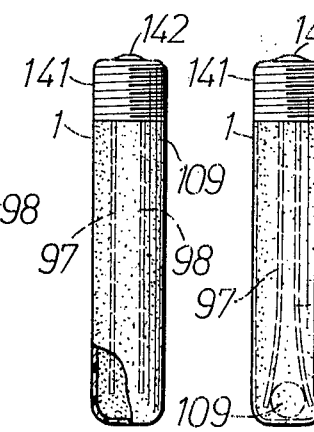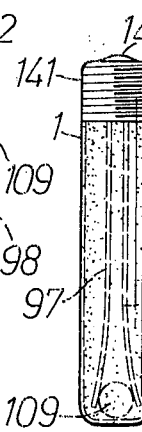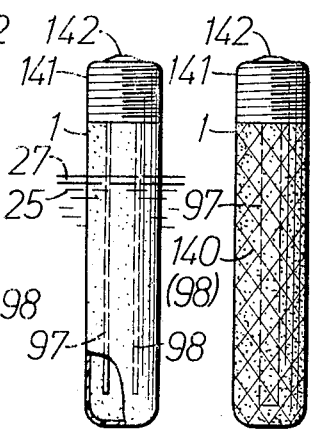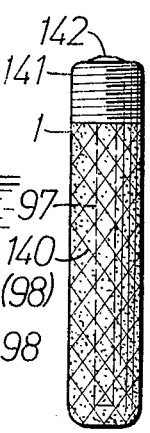
FIG_34A  FIG_34B  FIG_35  FIG_36  FIG_37  FIG_38  FIG_39  FIG_40  FIG_42  FIG_43  FIG_45

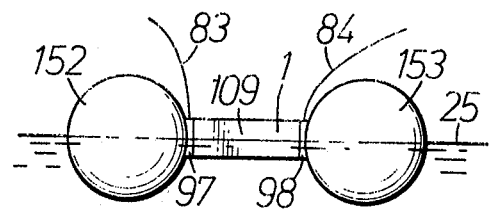
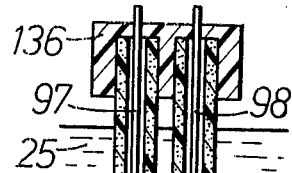
FIG_41
FIG_44
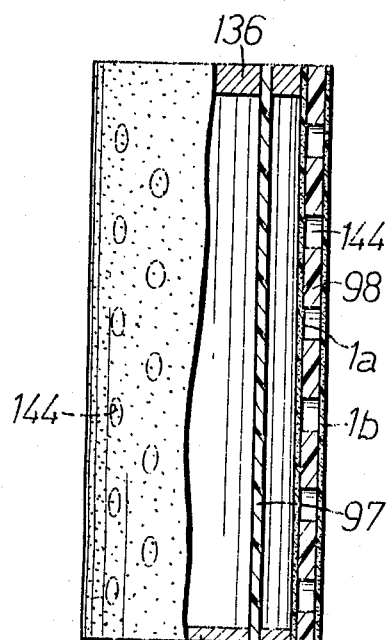
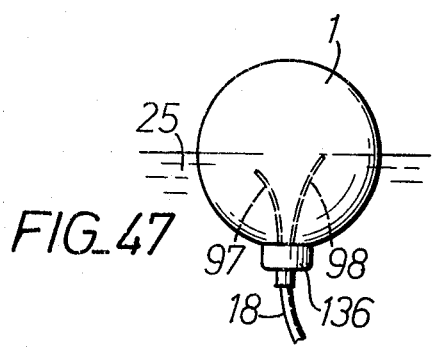
FIG_46
FIG_47
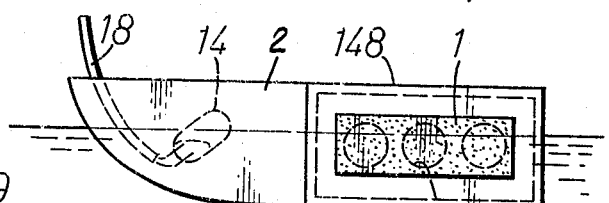
FIG_49
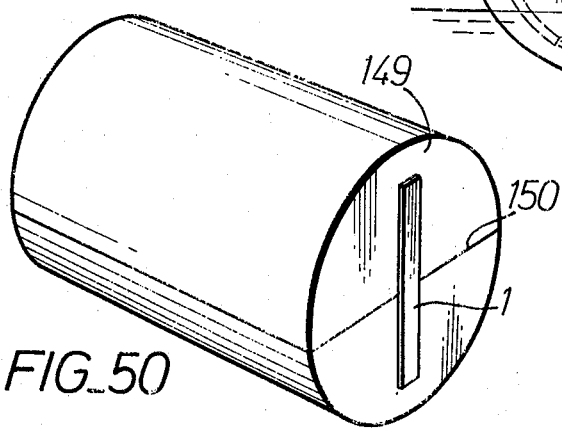
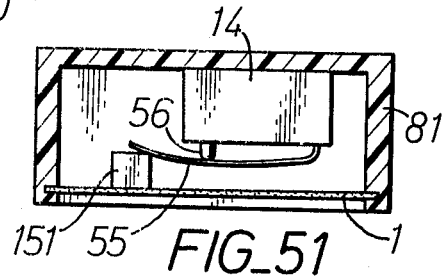
FIG_50
FIG_51

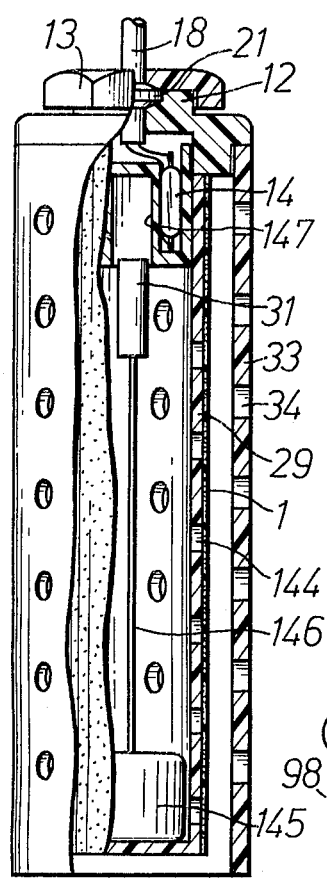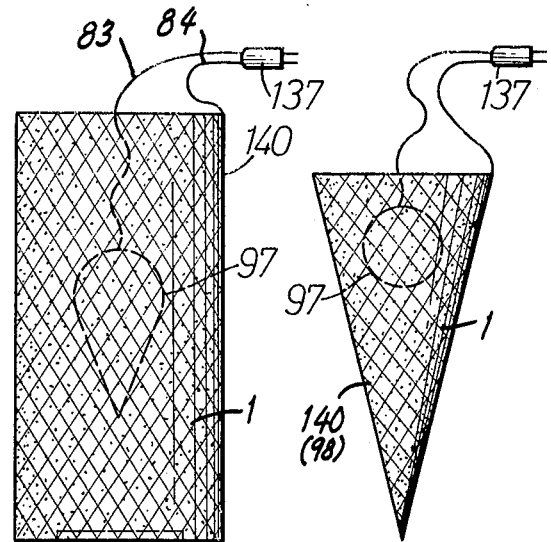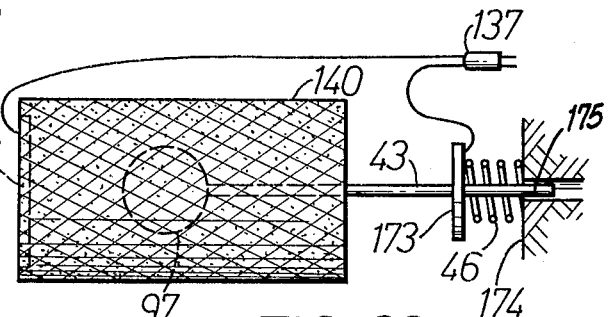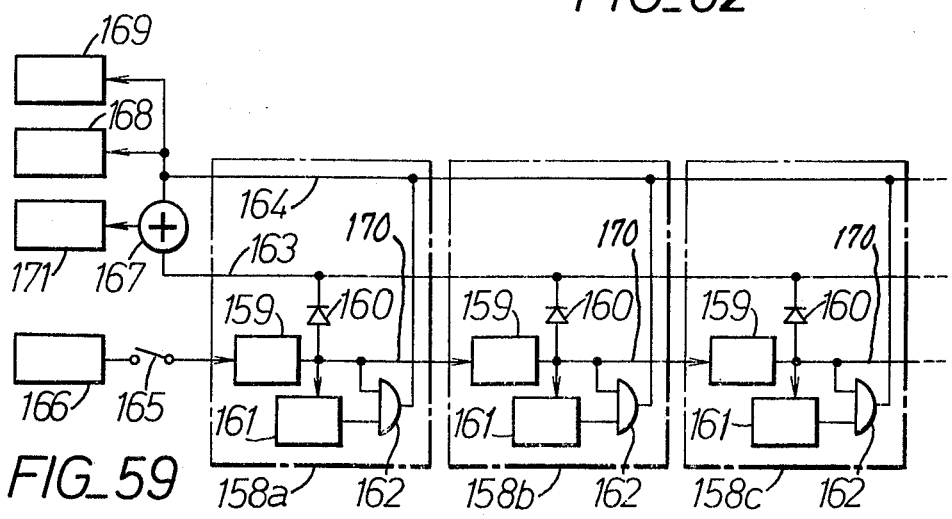

FIG_52
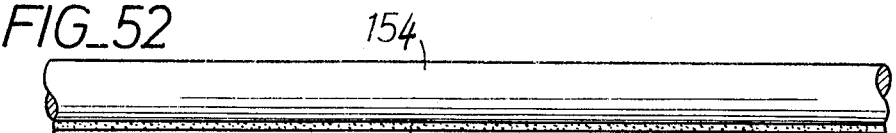
FIG_53
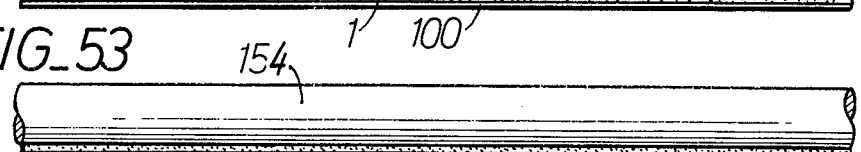
FIG_54
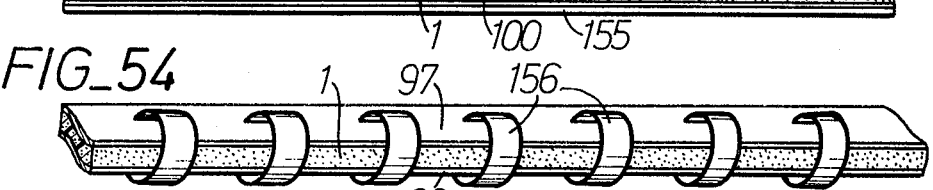
FIG_55
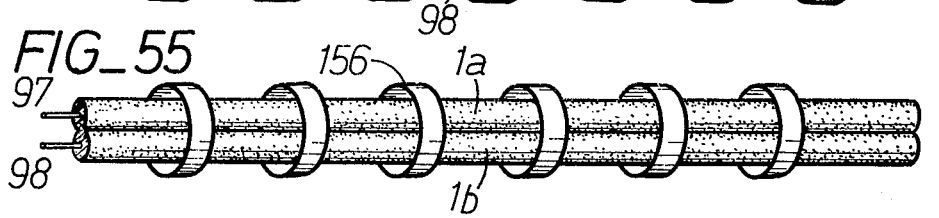
FIG_56A
FIG_56B
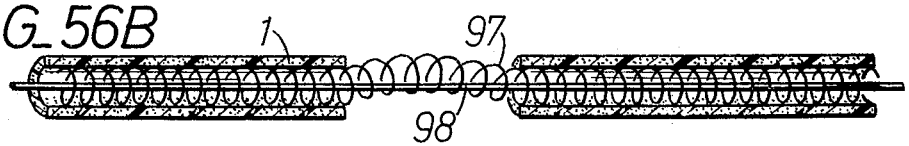
FIG_57A
FIG_57B
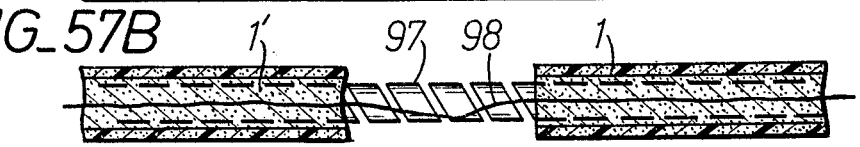
FIG_58
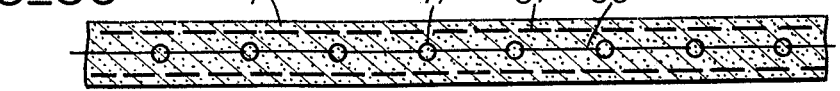

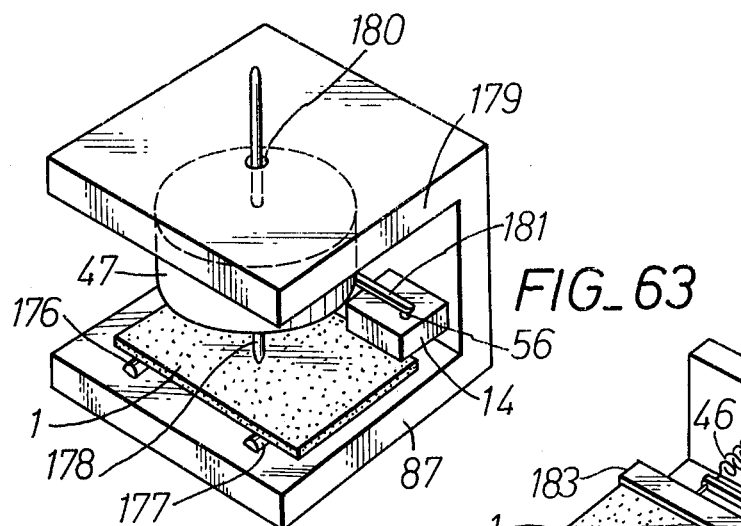
FIG_63
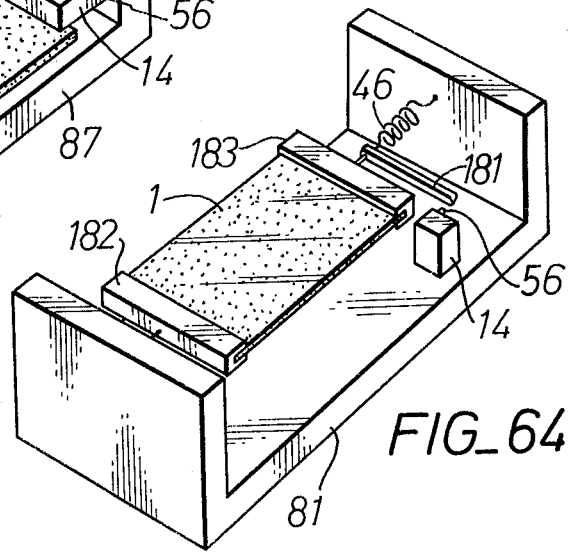
FIG_64
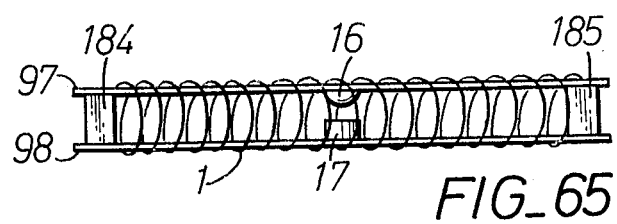
FIG_65
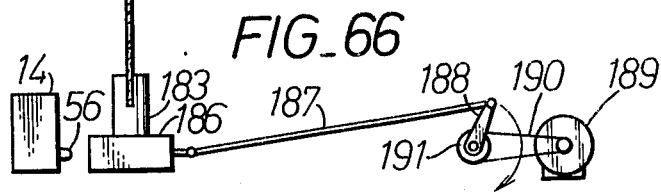
FIG_66

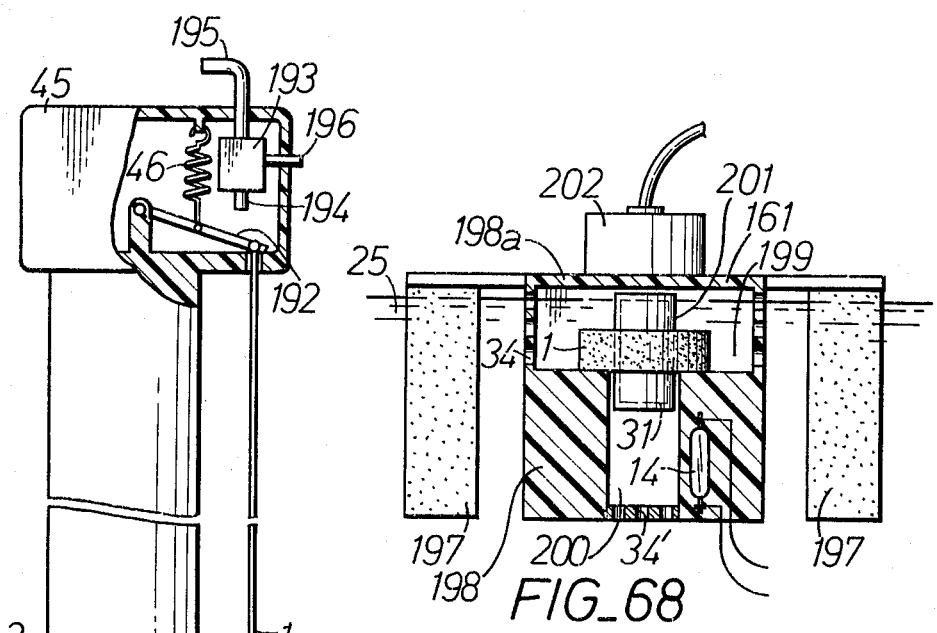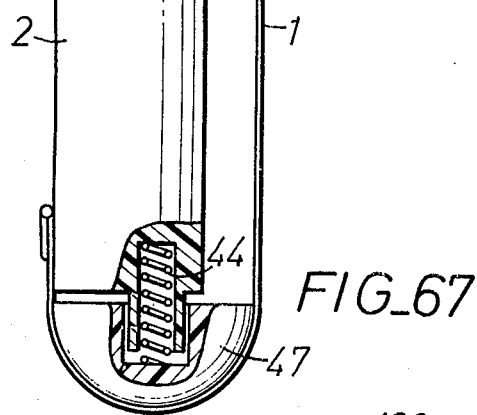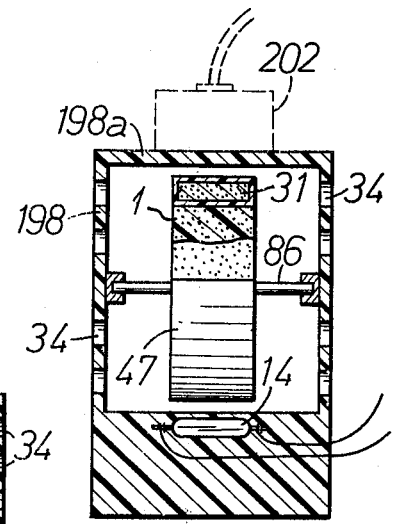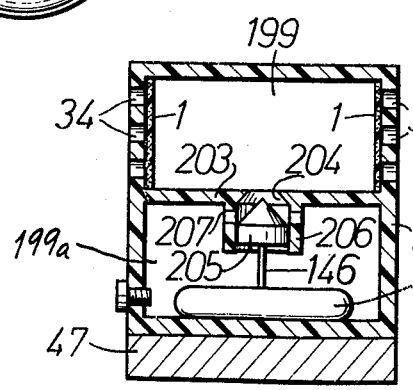

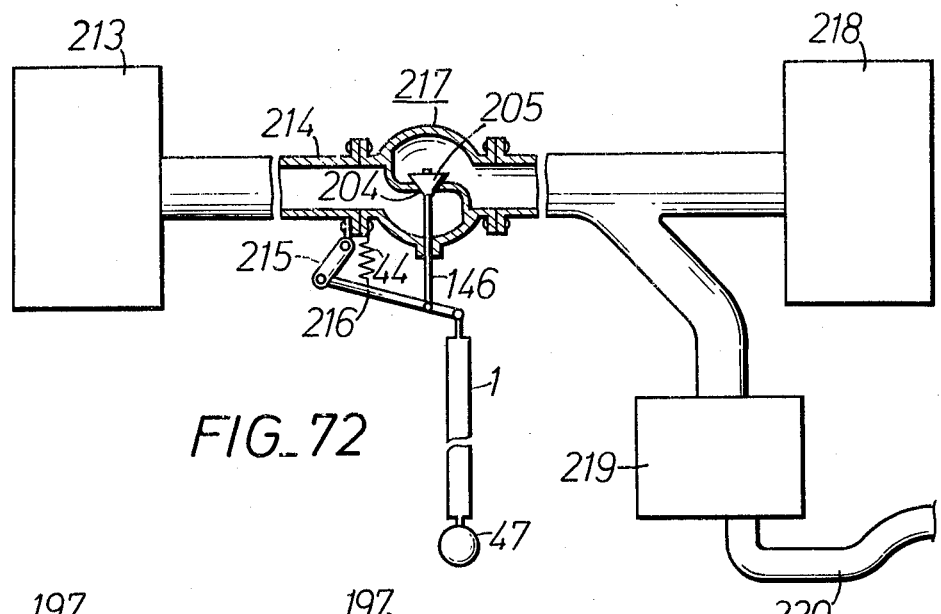
FIG_72
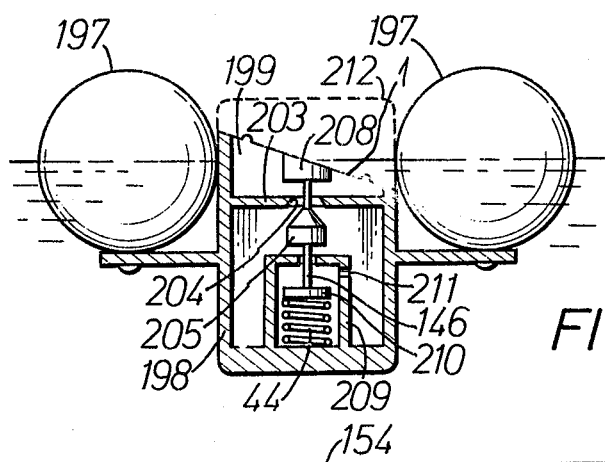
FIG_71
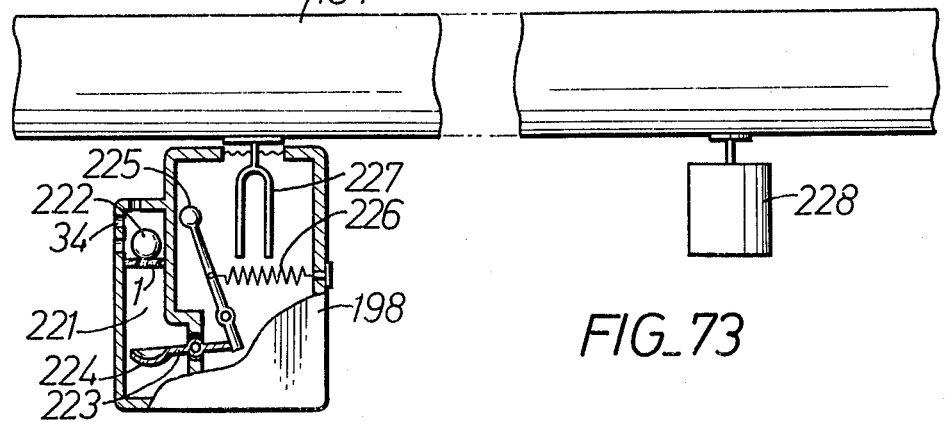
FIG_73

LIQUID DETECTOR

BACKGROUND OF THE INVENTION

The invention relates to a liquid detector which senses the presence of a particular liquid and produces a signal in response thereto.

In a petrochemical plant, tanks and liquid feed pumps are surrounded by weirs or barriers around which a watchman makes the round to ensure against the effluence of heavy oil or other disastrous products into drainage, river or lake in the event of occurrence of cracks in the tank or breakage of air-bleeder piping of liquid feed pumps. In view of the economical desirability of having as small a protective weir and as long a patrolling interval as possible or completely avoiding these costly preventive procedures if possible, it is highly desirable to have a provision for immediate detection and accommodation of various forms of leakage of petroleum and other chemical solutions such as would occur from a pipeline, tanker or submarine oil storage tank in order to minimize the damage to fisheries.

One of the prior art proposals for detecting the effluence of petroleum into sea or river uses the measurement of reflectivity, which depends on differential reflectivities, as sensed by constant irradiation of a liquid level to be watched and reception of reflected radiation therefrom, as between the presence and absence of petroleum on the liquid level. Usually light is chosen as the radiation for this purpose, but this approach is expensive in installation and has not sufficient reliability for its intended routine watching service, because of the necessity to avoid the influence of sunbeam and other extraneous light and the difficulty of maintaining a constant operating characteristic of the light-receiving element which is susceptible to deposition of dirts thereon and to splashes on account of its use above the liquid level. Detection of an oil leakage from a pipeline may take place by sensing a variation in the flow rate or oil pressure within the pipeline, but this suffers from the drawback that the detection fails unless a great quantity of effluent is allowed. A gas detector may be utilized which senses the gas produced by a liquid effluent leaking from a storage tank or pipeline. However, because of the dilution of the gas produced by the air, a substantial amount of effluence must take place before the gas is detectable, thereby causing a time lag from the commencement of the effluence until the detection. The gas detector technique fails for a liquid having a high boiling point and which hence produces little vapor at normal temperatures.

Another proposal utilizes the swelling phenomenon of a suitable material upon contact with a liquid to be detected for actuating an electrical contact or for blocking an air passageway. With a detector which relies on the swelling, it takes a relatively long time period for the material to be swollen, resulting in a slow operation of the detector. In addition, since most materials become softened upon being swollen, difficulties are encountered in assuring the satisfactory contact of the electrical contact or full blockade of the passageway, resulting in a detector of poor reliability. Detection of this kind is further rendered difficult by the limited number of available materials to be swollen and swelling liquids.

Therefore, it is an object of the invention to provide a liquid detector which is simple in construction, inexpensive and yet capable of reliably detecting the presence of a particular liquid.

It is another object of the invention to provide a liquid detector capable of rapidly detecting the presence of a particular liquid.

It is a further object of the invention to provide a liquid detector which provides a signal such as an electrical, mechanical or the like upon detection of the presence of a particular liquid.

It is an additional object of the invention to provide a liquid detector for reliably and rapidly detecting a detrimental liquid effluent into a river.

It is still another object of the invention to provide a liquid detector for reliably and rapidly detecting a liquid effluent onto the earth.

It is a further object of the invention to provide a liquid detector for reliably and rapidly detecting a liquid leakage from a pipeline or piping which carries petroleum, chemical liquid or the like.

It is yet another object of the invention to provide a liquid detector which allows the site of liquid leakage from a pipeline or piping to be located from a watching station.

It is an yet further object of the invention to provide a liquid detector which upon detection of the presence of a particular liquid, retains the fact of detection by storing the occurrence in a storage means.

It is further additional object of the invention to provide a liquid detector which retains a portion of a particular liquid when the presence of that liquid is detected.

It is yet additional object of the invention to provide a liquid detector having means for automatically performing a preventing measure to avoid the spread of an accident upon detection of the presence of a particular liquid.

SUMMARY OF THE INVENTION

The invention utilizes the fact that with certain materials, a change in their apparent specific gravity occurs when they are brought into contact with a particular liquid. Thus, according to the invention, a detector element is provided which changes in its apparent specific gravity upon contact with a liquid to be detected. A change in the apparent specific gravity of the detector element causes signal generating means to operate so as to produce a signal. As used herein, the term "a change in the apparent specific gravity" is intended to refer to a change in the specific gravity of a detector element, relative to that before contact thereof with a liquid, which occurs upon such contact as a result of physical phenomenon, chemical reaction or both causing the element to assume dissolution, softening or shrinkage condition, or to a change in the weight of a porous material caused upon contact therof with a liquid by substitution of the liquid for the internal pores therein or absorption condition, as compared with the weight before such contact. It is understood that more than one of dissolution, softening and shrinkage conditions may occur concurrently.

Upon a change in the apparent specific gravity of the element which accompanies a change in the weight thereof, the element directly moves or rotates, with such movement operating the signal generating means. Alternatively, upon a change in the apparent specific gravity of the detector element which accompanies a shift in the center of gravity, the element rotates to operate the signal generating means. In these instances, a biasing force may be applied which assists such motion. Alternatively, a biasing force including the gravity may be applied to a driving body so as to cause a motion such as rotation, movement or the like of the body upon a change in the apparent specific gravity of the type involving dissolution, softening or shrinkage, thereby operating the signal generating means with such motion. Such changes in the apparent specific gravity are used to open or close the contacts of electrical signal generating means. Alternatively, where a detector element undergoes dissolution causing a change in the apparent specific gravity, the electrical signal generating means may be operated by forming part of an electrical circuit with the element so that upon occurrence of such change, the circuit is interrupted or completed or less change in the resistance occurs rather than on-and-off change of the resistance.

The signal generating means may be electrical in nature, for example, for causing a change in the electrical resistance by directly interrupting an electrical path upon dissolution of the detector element or for controlling the opening or closing of contacts by a motion which is caused by a change in the apparent specific gravity of the detector element.

Such liquid detector may be disposed, for example, floating on or below the level of a sea, lake, river, drainage or the like to detect the liquid to be detected when it flows past the detector. Alternatively, the liquid detector may be located inside a protective weir surrounding a storage tank for dangerous product or liquid feed pump so as to detect any effluence of disastrous liquid. The detector elements may be distributed along a pipeline. In these manners, leakage effluence of a liquid to be detected can be achieved, thus allowing the patrolling of a watchman to be conducted at prolonged intervals or eliminated and allowing the weir capacity to be reduced. Since the liquid detector provides a signal upon detection, it is possible to take corrective actions automatically by using the signal to operate an alarm or to close the gate to a drainage.

As compared with the gasification or vaporization technique, the use of direct contact of a detector element with a liquid to be detected with concomitant change in the apparent specific gravity thereof for the purpose of detection can be seen to be more direct in terms of process, thus serving a rapid detection. In view of the direct contact utilized for detection, the detector element may be in the form of a film or heat radiating fan or porous in order to increase the surface area per unit volume for increased detection speed. A high detection speed may also be obtained by minimizing the weight per unit volume, as illustrated by the use of a synthetic resin foam. The use of a pre-stretched synthetic resin material is also advantageous. The sole requirement for a detector element is the fact that a change in the apparent specific gravity should occur upon its contact with a liquid to be detected, so that a material therefor is readily and inexpensively available. By way of example, Table 1 given below lists materials which can be dissolved in various liquids, i.e., which can be used as detector elements. For one of liquids within each group, any one of the materials in the corresponding group can be used either alone or in combination.

TABLE 1

|  | Liquids to be Detected | Materials Suitable for Detector Element |
| --- | --- | --- |
| Hydrocarbon Halides | Dichloro-ethane, Dichloro-benzene, Carbon-tetra-chloride, Trichloro-ethylene, Dibromoethane. | Polystyrene, Polymethylmethacrylate, Low-molecular-PVC, Polybutadiene. |
| Aliphatic Hydrocarbon | Hexane, Heptane, Octane Liquid Paraffin, Pentane, Ethylene Propylene. | Polybutadiene. |
| Aromatic Hydrocarbon | Benzene, Toluene, Xylene, Naphthalene, Dodecyl-benzene, Ethylbenzene, Styrene. | Polystyrene, Polyvinylacetal, Polymethylmethacrylate, Low-molecular-PVC. |
| Ketone | Acetone, Methylethylketone, Cyclohexane, Methyl-isobutylketone, Acetophenone. | PVC (Polyvinylchloride), Polyvinylformal, Polyvinylacetate. |
| Oil | Fatty Oil, Mineral Oil, (Crude Petroleum, Heavy Oil, Light Oil, Kerosene, Gasoline, etc.) | Polybutadiene, Low-Molecular Polyethylene, Low-Molecular Polypropylene, Natural Rubber Poly-t-Butylstyrene. |
| Alcohol | Methanol, Ethanol, Propanol Cyclohexanol, Benzyl Alcohol, Ethylene Glycol. | Polyacetal, Polyvinyl Alcohol, Polyvinyl Acetate, Polyvinyl Methylether. |
| Ether | Ethylether, Dioxan, Isopropylether, Ethylphenylether, Furan. | Polystyrene, Polychloroprene. |
| Ester | Methylformate, Ethylacetate, Ethylbenzoate, Methylpropionate, Phtalicester. | Polybutadiene. |

TABLE 1 — Continued

| Liquids to be Detected | | Materials Suitable for Detector Element |
|---|---|---|
| Nitrogen Compound | Nitromethane, Dimethylformamide Acrylnitrile, Acetonitrile, Acetone Cyanohydrin, Triethylamine Aniline, Pyridine, Morpholine. | Polybutadiene, Polyvinyl Alcohol, Polymethylmethacrylate. |
| Sulfa & Phosphorus Compound | Carbon Disulfide, Phosphoric Ester, Dimethyl Sulfoxide. | Polyacetophenone, Polyacrylnitrile. |
| Acid | Sulfuric Acid, Hydrochloric Acid, Formic Acid, Acetic Acid, Benzoic Acid, Phenolnitric Acid. | Polyvinylepyridine, Polyamid, Metal, Polyacetal, Polybutadienesulfone. |
| Base | Ammonium Liquid, Pyridine, Amine, Sodium Hydride, Potassium Hydride. | Polymethacric Acid, Polyacrylic Acid, Protein. |
| Water | | Polyvinyl Alcohol. |

Where detector elements are distributed along a pipeline so as to produce an electrical on- or off- signal upon occurrence of a change in the apparent specific gravity of a particular element due to leakage from the pipeline in a corresponding area, the leakage site can be located in a watching station based on the electrical signal generated. A multiplicity of the liquid detectors according to the invention can be distributed otherwise and monitored in a concentrated manner on the basis of the electrical signals emitted upon detection. Where such a concentrated monitoring is not used, the liquid detector may be provided with means for storing the occurrence of a signal so that the appearance of a liquid to be detected in the area covered is remembered even if the signal collapsed from the detector. Alternatively, a tamper-proof detector can be provided whereby the occurrence of a signal is shielded from view except by a watchman who uses a detector carrying with him to read out the memory in order to determine whether or not there occurred a detection. Additionally, a sampling means may be associated with the detector which is driven by a signal generated upon detection to sample a portion of the liquid detected, which sample is stored within the means for later removal and analysis.

While above Table 1 listed detector elements which can be used alone individually, other components may be added thereto. Thus, with a synthetic resin, it is known to soften it by addition of a plasticizer so as to lower the pour point to permit moulding at a lower temperature. This fact can be utilized to advantage in that where a liquid to be detected has an affinity with an oil such as paraffin, naphthalene or aroma oil which is generally used as plasticizer for synthetic rubber, as is the case with a liquid of the same family as the plasticizer oil mentioned above, such synthetic rubber may be used to increase the detection speed in preference to synthetic rubber not containing the plasticizer. In like manner, since mineral oil is used as plasticizer for polystyrene, the polystyrene containing this plasticizer is promoted its dissolution by a liquid of the same family (paraffin) as the mineral oil, and hence can be used as a detector element for the latter liquid, even though polystyrene alone can hardly be dissolved thereby. A resin comprising polystyrene in admixture with particles of synthetic rubber can be used as a detector element for a liquid of both benzene and hexane families. A copolymer of more than one ingredient such as polytertial butyl styrene or styrene block-copolymer can be used as the material of a detector element for more than one liquid, such as butyl and styrene. A copolymer of more than one ingredient can similarly be formed to serve as a detector element for more than one liquid.

A malfunction preventing material may be either mixed with or applied to a detector element in order to prevent the latter from being rendered inoperable as by attack by rat or bacteria or by adhesion of algae caused by immersion in the sea or to prevent a like external cause from causing a malfunction such as the failure of detection in the presence of a liquid to be detected and the generation of an erroneous signal in the absence of the liquid. The detector element is frequently used in a state of immersion into water, and thus it is desirable to provide a protective casing in which the element is placed and which permits in-flow of a liquid concerned, thus preventing adhesion of algae or degradation by irradiation of ultra-violet radiation.

BRIEF DESCRIPTION OF DRAWINGS

The above and other objects, features and advantages of the invention will be best understood from the following detailed description of certain embodiments thereof taken in conjunction with the drawings, in which:

FIG. 2 is a front view of another embodiment of the liquid detector of the invention, FIGS. 3 and 4 are front views, partly in section, of further related embodiments of the detector of the invention, FIGS. 5 to 8 are longitudinal sections of other embodiments of the detector of the invention, FIG. 9 is a front view, partly broken away, of another embodiment of the detector of the invention, FIG. 10 is a perspective view of another embodiment of the detector of the invention, FIG. 11 is a schematic front view of a further embodiment of the detector of the invention, FIG. 12 is a schematic perspective view of a further embodiment of the detector of the invention, FIG. 13 is a schematic front view of an additional embodiment of the liquid detector of the invention, FIGS. 14 and 15 are schematic sections of further embodiments of the detector of the invention, FIGS. 16 and 17 are schematic views of other embodiments of the invention, FIG. 18 is a schematic perspective view of another embodiment of the invention, FIG. 19 is a schematic side elevation of another embodiment of the invention, FIGS. 20 to 22 are schematic longitudinal sections illustrating further embodiments of the invention, FIG. 23 is a front view, partly in section, of another embodiment of the liquid detector of the invention, FIG. 23A is a section, to an enlarged scale, of part of FIG. 23, FIG. 23 is a side elevation of another embodiment of the invention, FIG. 25 is a section of another embodiment of the detector of the invention with the cap removed, FIG. 26A is a section of another embodiment of the detector of the invention with the cap and connector removed, FIG. 26B is a section of the embodiment shown in FIG. 26A with the cap and connector attached to the body, FIG. 27 is a schematic view of another embodiment of the detector of the invention with the cap removed, FIG. 28 is a front view of a further embodiment of the detector of the invention, illustrating the detector in its position without a lid, FIG. 29 is an exploded perspective view of another embodiment of the invention, FIG. 30A is a front view of a further embodiment of the invention, FIG. 30B is a side elevation of the embodiment shown in FIG. 30A, FIGS. 31 to 33 are schematic plan views illustrating further embodiments of the invention, FIG. 34A is a schematic section of a further embodiment of the invention, FIG. 34B is a schematic section illustrating the operation of the detector shown in FIG. 34A, FIGS. 35 to 38 are schematic sections of other embodiments of the invention, FIG. 39 is a schematic front view of another embodiment of the invention, FIGS. 40 to 43 are schematic front views of further embodiments of the invention, FIG. 44 is a schematic section of another embodiment of the invention, FIG. 45 is a front view of another embodiment of the invention, FIG. 46 is a schematic front view of another embodiment of the invention, with one-half being shown in section, FIG. 47 is a schematic front view of another embodiment of the invention, FIG. 48 is a front view of another embodiment of the liquid detector of the invention, with one-half being shown in section.

FIG. 49 is a schematic front view of another embodiment of the invention,

FIG. 50 is a schematic section of another embodiment of the invention,

FIG. 51 is a schematic front view of a further embodiment of the invention,

FIGS. 52 and 53 are front views of further embodiments of the invention,

FIGS. 54 and 55 are schematic perspective views of further embodiments of the invention, FIG. 56A is a schematic section of another embodiment of the invention, FIG. 56B is a schematic section, illustrating the operative condition of the detector shown in FIG. 56A, FIG. 57A is a section of another embodiment of the invention, FIG. 57B is a section illustrating the operative condition of the detector shown in FIG. 57A, FIG. 58 is a section of another embodiment of the invention, FIG. 59 is an electrical block diagram of detector means for locating the leakage site of a pipeline to which the liquid detector of the invention is applied, FIGS. 60 to 62 are schematic front views of further embodiments of the invention, FIGS. 63 and 64 are schematic perspective view showing further embodiments of the invention, FIGS. 65 and 66 are front views of further embodiments of the invention, and FIGS. 67 to 73 are sections illustrating further embodiments of the liquid detector of the invention.

DETAILED DESCRIPTION OF EMBODIMENTS

Figure 1:
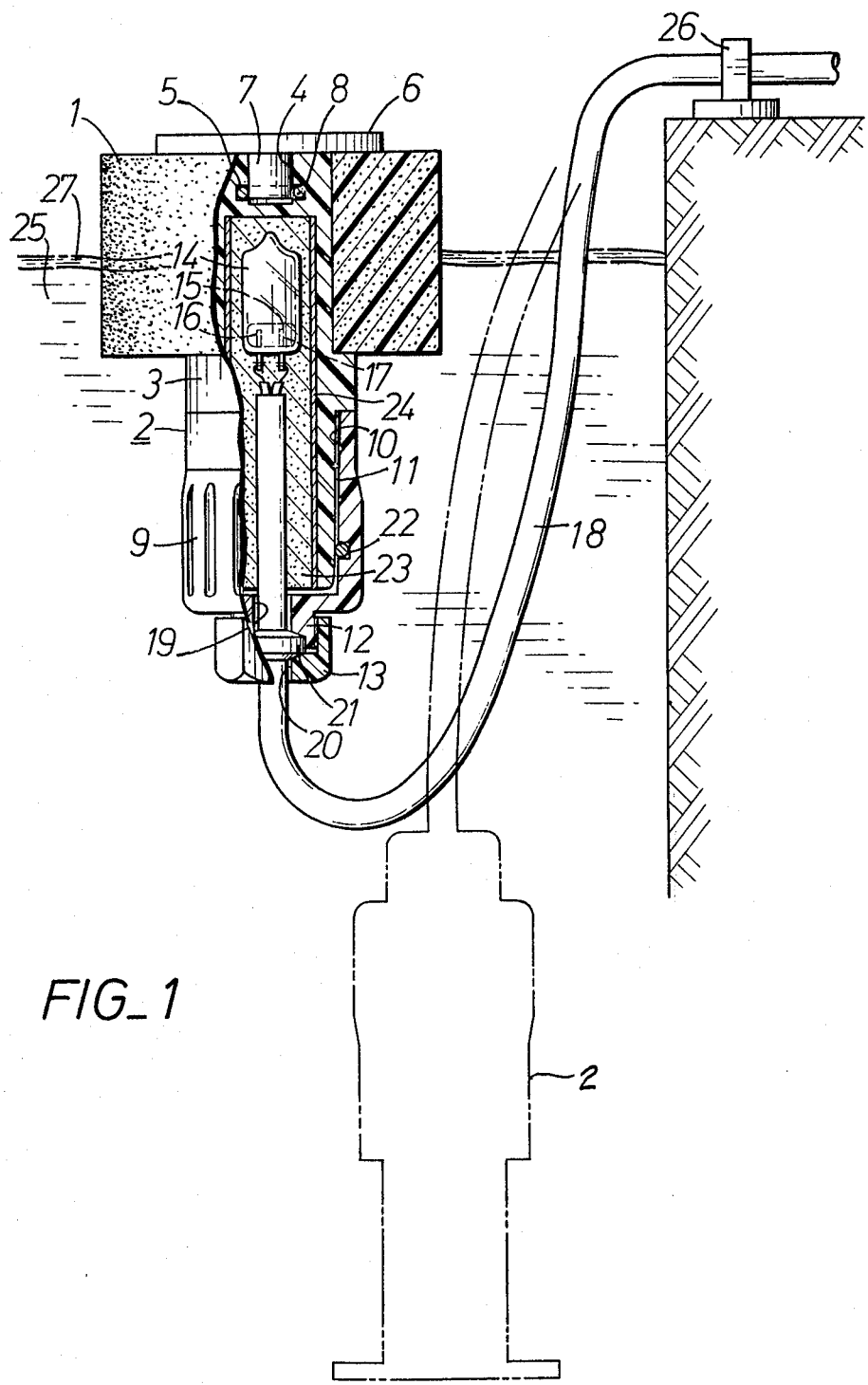
FIG. 1 is a front view, partly in section, of one embodiment of the liquid detector according to the invention.

Referring to the drawings, and particularly to FIG. 1 initially, there is shown a hollow cylindrical detector element 1, which may comprise foamed polystyrene, for example. A cylindrical body 2 has its one-half fitted in the element 1 concentrically, and has a flange 3 around its periphery in the intermediate portion thereof, which abuts at its one end against one end face of the element 1. One end face of the body 2 is flush with the other end face of the element 1, and has a circular recess 4 formed centrally therein. An annular groove 5 is formed around the inner periphery of the recess. A keep plate 6 has formed centrally on one of its sides a cylindrical projection 7 which is inserted into the recess 4. The projection 7 has an annular groove around its periphery which is aligned with the groove 5 in the recess 4 to fittingly receive a rubber ring 8, thereby securing the plate 6 with the body 2 and clamping the element 1 together with the body 2. A cap 9 is fitted on the remaining one-half of the body 2, and has a thread 10 formed internally for clamping engagement with an external thread 11 formed on the outer periphery of the body 2. The cap 9 has a head 12 which is formed with an external thread adapted to be engaged by a cap nut 13. The body 2, keep plate 6, cap 9 and cap nut 13 are made of chemically resistant material, for example, polystyrene.

An electrical switch 14 is housed within the body 2 as signal generating means. In the example shown, the switch 14 is a mercury switch having a body of mercury 15 and a pair of contacts 16, 17 which can be brought into contact with the body of mercury. A cable 18 including lead wires connected with the respective contacts extends through central bores 19 and 20 of the cap head 12 and the cap nut 13, respectively, to the exterior of the body. A resilient clamp ring 21 which comprises rubber, for example, is placed around the cable 18 and held sandwiched between the cap head 12 and the cap nut 13 so as to reduce its diameter for the purpose of fixing and sealing the cable with the body. An O-ring 22 is located between the body 2 and the cap 9 to provide a seal. An insulating filler 23 such as epoxy resin fills the inner cavity of the body 2 so as to position and protect the mercury switch 14 and its connection with the cable 18. If desired, a weight adjusting metal cylinder 24 may be fitted inside the body 2 along the inner periphery thereof.

The liquid detector thus constructed may be floating on a liquid level 25 such as the sea where the effluence of a liquid to be detected 27 is expected, by virtue of the buoyancy of the element 1. In this instance, the weight of the whole assembly is adjusted so that the end of the assembly adjacent the cap 9 is immersed into the liquid 25 to a depth reaching half the height of the element 1, as shown. The free end of the cable 18 is anchored at 26 on the shore in a manner permitting the assembly to assume such a position. When a liquid 27 to be detected such as benzene, styrene or the like drifts on the liquid level 25, the element 1 comprising formed styrene is dissolved to cause a change in the apparent specific gravity thereof, whereupon the body 2 which has been floating on account of the buoyancy of the element now sinks into the liquid 25 and becomes inverted as shown in broken lines, because of the anchored cable, with the cap nut 13 positioned up and the keep plate 6 down. This causes the mercury switch 14 to be inverted, whereby the body of mercury 15 no longer bridges across the contacts 16, 17, resulting in an electrical interruption of the contacts. In the present case, the presence of liquid 27 to be detected causes a change in the apparent specific gravity of the element 1, and the body 2 serving as a driver rotates by gravity to turn off the switch 14, which acts as signal generating means to provide an electrical signal as an indication of the presence of the liquid 27. In an example, the element 1 comprised bead-foamed polystyrene with a foaming multiplication factor of about 15, and had a thickness of 35 millimeters, an external diamer of 60 millimeters and an inner diameter of 22 millimeters. A 5 millimeter thick layer of liquid styrene as liquid 27 was formed on water 25 at 20°C to float the detector so that one-half of the element 1 was immersed as shown. The switch 14 operated after 35 seconds of immersion.

The embodiment of FIG. 1 may be modified by replacement of the element 1 by a body of porous material having a strong affinity with a liquid to be detected so that upon contact with this liquid, the pores within the body are filled with the latter to cause a change in the apparent specific gravity. An oil adsorbent may be used for this purpose. An exemplary oil adsorbent comprises particles of 73.2% of $SiO_2$, 22.2% of $Al_2O_3$, 0.8% of $Fe_2O_3$, 0.4% of $CaO$, 1.6% of $Na_2O$ and 1.2% of $K_2O$ on a weight basis, sintered together to a porous body having an apparent specific gravity less than 1.0. This oil adsorbent will be floating on water or sea, and adsorb heavy oil, for example, to fill the pores, whereupon it will have an apparent specific gravity greater than 1.0 and sink into the water. When an adsorbent comprises particles of a diameter on the order of 3.0 millimeters, it will sink into the water upon adsorption of 55 percent by volume of low boiling heavy oil, 70 percent by volume of spindle oil, and 62 percent by volume of creosote, as referenced to the volume of the adsorbent. Because an absorption of liquids other than oil, thus even water, will occur for a prolonged period of immersion into the water of the element 1 of this kind, the surface of the adsorbent is preferably treated with paraffin or the like to be water repellent.

When such an element 1 is used in the arrangement of FIG. 1, the effluence of oil onto the liquid level 25 replaces the pores within the element 1, increasing the apparent specific gravity thereof and causing the assembly to sink into the liquid 25 to turn off the switch 14, whereby the presence of petroleum is detected.

In another example, a cruciform plate measuring 65 and 35 millimeters from the center in orthogonal directions was cut from a block of the adsorbent mentioned above and formed with an aperture of 22 millimeters in diameter in its center to form the element 1. A 5 millimeter thick layer of low boiling heavy oil was formed on a water at 20°C, and the element 1 was laid floating on the water. Two specimens were used. One having a thickness of 28 millimeters operated the switch 14 after 12 seconds, while the other, 21.5 millimeter thick, operated the switch after 5 seconds.

Usually an oil adsorbent is available in a big block form, and when it is used as the detector element 1 of the invention, a compact, practical configuration must be obtained. At this end, the block of the oil adsorbent was ground, and to 100 parts by weight thereof was added 10 parts of epoxy resin and 1 part of hardener to perform a moulding. An excessive amount of epoxy resin results in a poor porosity, while its insufficient addition renders the moulding inoperable. The above given value indicates the approximate minimum. A quadrant sector was formed having a radius of 33 millimeters and a thickness of 18 millimeters, and was laid floating on a 5 millimeter thick layer of high boiling heavy oil formed on a water (25°C). Several specimens were prepared. The time length elapsed until the switch operated was 44 seconds for one specimen using ground particles of a diameter in the range from 0.6 to 1.2 millimeters, while another specimen using a particle diameter from 1.2 to 2.5 millimeters sank after 34 seconds, and a further specimen using particles of diameters greater than 2.5 millimeters remained floating. It is thus seen that the use of particle diameters in the range from 1.2 to 2.5 millimeters results in a rapid sinking and hence is preferred.

The detection speed obtained by using a detector element involving a change in the apparent specific gravity of the kind represented by such an oil adsorbent can be increased by increasing the surface area per unit volume, as by using the shape of a heat radiating fin exemplified by the foregoing example. The detection speed can also be increased by forming on the individual particles a film of material having a strong affinity with a liquid to be detected. In addition to oil adsorbents, a detector element of this kind may comprise short fibres of lengths ranging from 10 to 30 millimeters and applied with paraffin, vaselin or the like.

In FIG. 2, the detector element 1 is in the form of a hollow semi-cylinder having a short axial length joined with a conforming body 28, which together form a full cylinder. Upon adsorption of a liquid to be detected by the element 1, the one-half including the element 1 becomes heavier than the rest, causing the body 2 to assume a position in which the axis thereof is horizontal and thus rapidly enabling a detection. It is to be noted that in FIG. 2 and throughout the remainder of the drawings, like parts are designated by corresponding reference characters as shown in FIG. 1 or other Figures.

An arrangement may be provided whereby a change in the apparent specific gravity causes a driving body to move directly to operate signal generating means. FIG. 3 shows an embodiment of the arrangement. A body 2 of block form has a central bottom opening in which one end of an elongate cylindrical guide member 29 comprising stainless steel, for example, is inserted and adhesively held. A cylindrical retainer 30 formed of polyethylene is loosely fitted on the guide member 29, and a cylindrical detector element 1 is fitted on the retainer 30 in contact with its outer periphery. A ring-shaped permanent magnet 31 is embedded in the retainer 30. The free end of the guide member 29 is attached with a stop 32 which prevents the retainer 30 from sliding out of the member and seals the interior thereof. Formed within the body 2 is an aperture extending therethrough which communicates with the interior of the guide member 29. At its outer end, the body is formed with an integral projection 12 having an aligned aperture, through which a cable is introduced into the interior of the guide member 29. As before, a cap nut 13 threadably engages the projection which in the embodiment of FIG. 1 was a cap head, and the cable is clamped by a clamp ring 21 which also provides a seal.

A reed switch 14 is located on the stop 32 in the inner end of a cable 18 and is connected with a pair of lead wires therein. In the example shown, a protective sheath 33 is arranged in coaxial relationship with the element 1 and has one end in which part of the body 2 is received and adhesively secured. The sheath 33 is formed of material resistant to a liquid such as water in which it is placed and to a liquid to be detected, and is formed with distributed small openings 34 to permit the passage of the liquids therethrough.

The liquid detector described above is installed in a liquid 25 with its cable end upside and the guide member 29 upright. The element 1 is raised, due to its buoyancy, by the liquid entering the sheath 33 and is normally removed away from the reed switch 14. When a liquid to be detected reaches the detector, the element 1 becomes dissolved or heavier as mentioned above to lose its buoyancy, whereby it falls along the guide member 29 until it is stopped at a position corresponding to the stop 32. Then the magnet 31 is positioned close enough to the reed switch 14, thereby turning it on and generating a signal.

In an example, a ring of bead-foamed polystyrene with a foaming multiplication factor of 15 was formed to have an outer diameter of 60 millimeters, an inner diameter of 35 millimeters and a thickness of 35 millimeters, and a magnet 31 was embedded therein. A 5 millimeter thick layer of styrene was formed on a water at 20°C, and the detector was laid floating thereon. The switch 14 operated after about 46 seconds.

The presence of the protective sheath 33 prevents accumulation of algae on the element 1, guide member 29 and else even for an immersed of the liquid detector in a water, and thus assures a reliable operation for a prolonged period. The protective sheath 33 may be made of more inexpensive vinyl chloride resin, though less chemically resistant than polyethylene. The entire retainer 30 may be constituted by the magnet 31.

In place of floating the retainer 30 by means of the element 1, the element 1 may suspend the body 2. An exemplary arrangement is shown in FIG. 4 in which a part of tape-like elements 1a and 1b are attached at their one end to the periphery of a retainer 30 at diametrically opposite positions. The attachment is achieved by forming an annular groove 35 in the periphery of the retainer 30, and by clamping an openring spring 36 into the groove with the ends of the elements 1a, 1b held sandwiched therebetween in a form extending around the peripheral surface of the retainer 30 and parallel to the axis. The body 2 is internally formed with an integral mounting base 37 of approximately the same diameter as the retainer 30, and the other end of the element 1 is clamped against the peripheral surface of the mounting base 37 by an open-ring spring 38. The retainer 30 is thus suspended by the elements 1a, 1b at a position above a switch 14 which is normally off.

When the elements 1a, 1b become dissolved upon contact with a liquid to be detected, the retainer 30 falls to turn the switch 14 on. In an example, the elements 1a, 1b were made from polystyrene or polymethyl methacrylate in a tape form having a thickness of 50 microns, width of 10 to 20 millimeters and length of 300 to 500 millimeters.

FIG. 5 shows another embodiment using a detector element 1 of tape form. A retainer 30 is carried by the lower end of a cylindrical body 2 and is formed in its top with a recess 40 in which the lower end portion of the body 2 is received. A permanent magnet 31 is carried with the recess 40 in coaxial manner. A reed switch 14 is disposed within the body 2 so as to be opposite the magnet 31. An aperture 41 extends centrally through the retainer from the bottom of the recess 40 and restricted in its intermediate position by a peripheral flange 42 formed integral with the retainer. A guide rod 43 secured to the bottom surface of the body 2 extends through the opening defined by the flange 42 to a position near the lower end of the aperture 41, and carries a stop 32 at its lower extremity.

A tape-like detector element 1 extends lengthwise from the outer side of the body 2 at its upper portion, follows the bottom surface of the retainer 30, and then extends lengthwise along the opposite side of the body 2 to its upper portion. At its opposite ends, the element 1 is clamped against the body 2 by way of an open-ring spring 38. The retainer 30 is biased downward by gravity, and is further biased downward by means of a coil spring 44 placed around the guide rod 43 between the bottom surface of the body 2 and the flange 42.

When the element 1 comes into contact with a liquid to be detected, it is dissolved, whereby the retainer 30 moves down and the magnet 31 moves out of alignment with the reed switch 14, thereby turning it off. By virtue of the engagement between the flange 42 and the stop 32, the retainer 30 is prevented from sinking to the bottom of the sea. As soon as the element 1 commences to be dissolved, the bias on the retainer 30 imparted by gravity as well as by the spring 44 is effective to cut the element 1 off rapidly, thereby advantageously improving the detection speed. However, it will be appreciated that the spring 44 may be omitted.

A further embodiment is shown in FIG. 6 wherein a casing 45 is mounted on top of a body 2 and a permanent magnet 31 is suspended by a coil spring 46 from the top wall thereof. To the bottom surface of the magnet 31 is secured one end of a tape-like or cord-like detector element 1, which extends through an aperture in the body 2 to the exterior of the casing 45 and carries a weight 47 at its free end. The gravity on the weight 47 causes the magnet 31 to abut against the body 2, and in this position, the magnet 31 is out of alignment with a reed switch 14 located internally on the side wall of the casing 45, thus maintaining the switch off. A pair of terminals 58 and 59 for the switch 14 are mounted on the casing 45.

When the detector element 1 comes into contact with a liquid to be detected and dissolves therein to be broken, the magnet 31 is raised upwardly by the spring 46, moving into alignment with the reed switch 14 to turn it on. In order to avoid oscillation of the element 1, a restriction plate 48 is integrally formed within the protective sheath 33 immediately above the weight 47 and formed with an opening through which the element 1 extends. To avoid breakage of the element 1 during shipment, a cap 49 is mounted on the bottom of the sheath 33 to bear against the weight 47, the cap being adapted to be removed when in use.

FIG. 7 shows another embodiment using a tape-like detector element 1. The element 1 extends around the free end of a body 2 and has its opposite end portions extending along the opposite walls of the body 2. The ends of the element 1 are attached to a casing 45. This attachment is achieved by mounting a hook 50 on the bottom surface of the casing 45 and engaging it with a similar hook 51 secured to the element 1. A pair of hooks 52 and 53 are used for the other end of the element 1 to engage it with a permanent magnet 31, which is located externally of the casing 45 and is suspended by a coil spring 46 that is secured at its other end to an extension therefrom. A switch 14 in the form of a microswitch is housed within the casing 45. There is provided a pivotable arm 55 having a magnetic piece 54 at its one end.

When the element 1 comes into contact with a liquid to be detected and becomes dissolved therein to be broken, the magnet 31 is raised upward by the spring 46, moving close to the magnetic piece 54 to attract it, and causing the arm 55 to turn, whereby the operating lug 56 of the switch 14 is depressed by the turning arm 55 to operate the switch. A guide frame 57 is mounted on the casing 45 for guiding the movement of the magnet 31. A pair of terminals 58 and 59 for the switch 14 are mounted on the casing 45. The microswitch may be replaced by a reed switch which is controlled by the movement of the magnet 31.

FIG. 8 shows a further embodiment using a tape-like detector element 1. A retainer 30 having a lever-like portion is rotatably carried by the free end of a body 2 so as to form part thereof. An element 1 is mounted to extend the combined periphery of the body 2 and the retainer 30. A recess formed in the body 2 and located opposite the lever portion receives a coil spring 44, which urges the lever portion and the whole retainer 30 in a direction away from the body.

When the element 1 becomes dissolved and broken or becomes softened to lengthen, the retainer 30 turns away from the body 2, whereby a magnet 31 carried therein also moves away from a reed switch 14 carried by the body 2, turning it off.

FIG. 9 shows a still further embodiment using a tape-like or cord-like detector element 1. To a body 2 is secured one end of a so-called tape switch 60 which is usually found as a mat switch for an automatic door. The element 1 bridges across the body 2 and the free end of the tape switch 60 so as to make the latter to assume a curved configuration. A fixture for the element 1 comprises a pair of oppositely disposed catch members 62, 63 which are connected together at their intermediate portion to permit relative rotation, and a spring 64 extending between the one ends of the members 62, 63. The spring 64 urges the one ends of the members apart, thereby enabling the element 1 to be held grasped between the other ends of these members.

The tape switch 60 comprises a pair of closely spaced resilient contact members 65 and 66 which are brought into contact with each other when the tape switch 60 assumes a curved configuration. Thus the tape switch 60 is held on when the element 1 is not broken, but is turned off to provide an indication of the presence of a liquid to be detected when the element 1 comes into contact therewith and becomes dissolved therein or lengthens.

In the preceding description, where use is made of magnet 31 and reed switch 14, the arrangement was such as will cause a motion of the permanent magnet 31, but an arrangement is possible which permits the magnet 31 and reed switch 14 to remain stationary. This is illustrated in FIG. 10. An aperture is formed extending through a body 2 and a casing 45, and a magnetic shield plate 68 is arranged therein to be slidable therealong. To the lower end of the shield plate 68 is mounted one end of a detector element 1, the other or lower end of which is provided with a weight 47. A support member 69 is secured to the body 2, and pivotally mounted on the support member 69 at its intermediate portion is a pivotable arm 70 having the upper end of the shield plate 68 suspended from its one end and having a weight 71 secured at its other end.

A reed switch and a permanent magnet (obscured behind plate 68 and corresponding to one designated by 31 previously) are mounted with the casing 45, with the shield plate 68 disposed in a shielding position between them. When the element 1 becomes dissolved to be broken, the gravity of the weight 71 causes the pivotable arm 70 to rotate clockwise and hence to cause the shield plate 68 to raise out of the casing, the magnet then serving to turn the reed switch on. The element 1 used in this arrangement may be in the form of tape, thread, cord or rod.

Several examples will now be given in which the element 1 is biased by means of a weight such as weight 47 and the dissolution and breakage of the element 1 serves to operate a switch such as referred to above as switch 14. Referring to FIG. 11, a rod-shaped detector element 1 is formed of a suitable foamed synthetic resin material, for example, and is attached with a weight 47 at its lower end. The upper end of the element is connected with a cord or rope 72 that runs over pulleys 74 mounted on a stanchion 69. The other end of the cord 72 is connected with a second weight 71, which is adjusted so that the element 1 is positioned within liquid 25 running through a drainage 73. When the element 1 comes into contact with a liquid to be detected and becomes dissolved to be broken, the weight 71 falls onto the operating lug 56 of a switch 14, thereby turning it either on or off.

In FIG. 12, a microswitch 14 is housed within a casing 45, and a sleeve 75 is rotatably carried by a shaft (not shown) secured across a pair of opposite walls of the casing 45. The opposite ends of the sleeve 75 project externally of the casing and are secured with the respective ends of a channel-shaped arm 76, and a detector element 1 has its upper end connected with the base of the arm 76 intermediate its ends to be suspended therefrom. At the remote side from the arm 76, another arm 77 is secured to the sleeve 75 inside the casing 45 and has a weight 71 attached to its free end. By the torque applied by the gravity of the weight 47, the other weight 71 is normally urged against the operating lug of the microswitch. As a consequence, when the element 1 becomes dissolved in a liquid to be detected and broken, the weight 71 rotates downwardly about the sleeve 75, moving away from and operating the switch 14.

Referring to FIG. 13, a casing 45 houses a microswitch 14 on top of which is mounted a shaft 78, around which one end of a leaf spring 79 is wrapped to abut against the casing 45 at one extremity, thus urging the other end upward. The other end which is biased upward extends externally of the casing 45, and is engaged by a cord or rope 72 which suspends a detector element 1 carrying a weight 47. Thus, the other end of the leaf spring is biased downward by yielding to the gravity of that weight and hence is flexed to depress the operating lug 56 of the microswitch. Upon breakage of the element 1, the leaf spring 79 springs back upwardly, allowing the lug 56 to project.

Referring to FIG. 14, a detector element 1 has its upper end connected with a guide rod 43 which extends through an opening in the bottom plate of a casing 45 into the interior thereof. An abutment plate 80 is secured to the inner end of the guide rod 43, and a coil spring 46 is placed around the guide rod 43 between the plate 80 and the bottom plate of the casing 45. Upon dissolution and breakage of the element 1, the spring 46 urges the plate 80 into abutment with the operating lug 56 of a microswitch 14.

Referring to FIG. 15, a body 2 is threadably engaged with the upper end of a protective sheath 33, and to the bottom surface of the body 2 is secured a detector element 1 having a weight 47 attached at its lower end. A metal plate 82 is located directly below the weight 47 and mounted on the bottom plate 33a of the protective sheath. The weight 47 is constructed of a metal or is provided with a metal plate applied to its bottom surface. The weight 47 or its metal bottom and the metal plate 82 are connected through a pair of lead wires 83, 84, respectively, to a pair of terminals 58, 59 located in the body 2. The weight 47 and the metal plate 82 serve as a switch, which is closed when the element 1 becomes broken.

Another embodiment not utilizing a nominal switch as in FIG. 15 is shown in FIG. 16 wherein a U-shaped support frame 81 formed of an insulating material has its limbs 81a and 81b bridged by a coil spring 46 and a ribbon- or cord- or rod-shaped detector element 1. The coil spring is electrically conductive and has its one end connected with a terminal 58 on the support frame 81 and its other end formed with a laterally extending blade-like contact 16. A stationary contact 17 is mounted on a terminal 59 so as to extend opposite to the contact 16. The spacing between the contacts 16 and 17 is chosen such that a contact is made therebetween by shrinkage of the tensioned spring 46 when the element 1 is dissolved to break or softened.

While in the preceding embodiments, a change in the apparent specific gravity has been utilized primarily to provide a translational movement of a driving body for operating the signal generating means, examples whereby the signal generating means is operated by rotational movement of the driving body will be described below. Referring to FIG. 17, a detector element 1 has formed in its one end face an opening in which a body 2 is inserted for connecting them together. This connection may be formed by a threadable engagement or by a pair of resilient blades mounted on the body and resiliently grasping part of the element 1 therebetween. At its other end, the element 1 carries a weight 47, the connection therebetween can be achieved in a similar manner as that between the element 1 and the body 2.

At a point nearer the element 1, the body 2 is mounted on a shaft 86 which is rotatably journalled in a pair of stanchions 88a and 88b extending vertically from a base plate 87. Because of the presence of the weight 47 at the end of the element 1 remote from the body 2, the assembly tilts with the element 1 biased down. A mercury switch 14 which can be actuated by an angular motion of the body 2 is housed therein.

When the element 1 comes into contact with a liquid to be detected and becomes dissolved therein, the weight 47 is freed from the element 1. As a result, the body 2 rotates clockwise or downward and the switch 14 is operated. The element 1 can be in the form of a thread or cord as illustrated in FIG. 18, wherein it will be noted that the body 2 is provided with a hook 50 at its end adjacent to the shaft 86, the hook 50 being engaged by one end of the cord-like element 1 having the weight 47 at its lower end.

In a further modification the weight 47 shown in FIG. 17 can be omitted. Thus referring to FIG. 19, a frame 89 is formed by respective extensions from the stanchions 88a and 88b, the extension initially running parallel to the base plate 87 and then being bent to run toward the base plate 87, with their free ends connected together by a cross brace. The frame 89 is constructed so that its lower extremity bears against the free end of the element 1 to prevent the clockwise rotation of the body 2 until element 1 is softened or dissolves.

In addition to those shown in FIGS. 1 and 2, liquid detectors which are operative by rotational movement without the provision of a pivot or shaft for rotation should desirably be constructed so that they are operable in an arrangement other than floating in a body of liquid, for example, when installed inside a protective weir. Embodiments of this kind will be described below.

Referring to FIG. 20, the assembly shown comprises a block, each one-half of which is constituted by a detector element 1 and a body 2, respectively. The block is formed with an internal passageway 90 communicating between the element 1 and the body 2. The passageway 90 terminates at its one end in a recess 91, in which a microswitch 14 is located. The switch has an operating lug 56 on which is pivotally mounted a recessed driving piece 92 having a ball 93 resting thereon, so that the lug 56 is depressed by the weight of the ball 93.

The liquid detector comprising the block is adapted to be placed within a pool 95, usually referred to as a pit, inside a protective weir 94 so as to lay the element 1 and the body 2 in side-by-side relationship. Where simple water such as by rain is accumulated in the pool 95, both the element 1 and the body 2 float concurrently. However, when a liquid to be detected flows into the pool, the element 1 will have an increased weight, so that as a result of floating of the body 2 relative to the element 1, the passageway 90 becomes inclined to permit the ball 93 rolling to the other end thereof. Release of the weight from the lug 56 causes the switch 14 to be operated. The recessed driving piece 92 prevents malfunction by precluding the movement of the ball 93 in response to an external vibration, but by allowing the ball 93 to move only after the angle of inclination of the passageway 90 has reached a given value. The movement of the ball 93, once initiated, promotes the tilting motion of the passageway 90. A switch operation can be achieved without the microswitch 14, ball 93 and the like, by simply introducing a given amount of electrically conductive liquid in the passageway 90 and disposing a pair of contacts in the other recessed end thereof. Alternatively, the passageway 90 can be removed entirely, and a mercury switch, for example, may be internally housed in the body 2.

As shown in FIG. 21, a detector element 1 may comprise a column of foamed synthetic resin material and internally house a switch 14. The element 1 stands in a pool 95. When a liquid to be detected flows into the pool and the base portion of the element 1 is dissolved, it loses balance to turn over, thereby operating the switch 14.

In FIG. 22, a detector element 1 of block form is provided in its top surface with a pyramid-shaped opening, in which a body 2 having a conforming lower end is inserted to stand thereon. When the element 1 comes into contact with a liquid to be detected and becomes dissolved, due to the pointed shape of the lower end, the body 2 loses balance, thereby assuring a turn-over. A switch 14 shown to be internally housed in the body may be removed by forming the body 2 of a metal and placing the element 1 on a metal plate 82 so that upon turn-over of the body 2, the latter comes into electrical contact with the plate 82, thus achieving a switch action. The body 2 may be additionally provided with a flag 96 to provide a remotely-monitored visual indication of the presence of a liquid to be detected when it turns over. Thus the flag 96 provides a mechanical signal.

A detection of a liquid to be detected can also be performed in a form such that upon contact with the liquid, a change in the apparent specific gravity of the detector element 1 which is made electrically conductive results, by breakage, in a direct change of an electrical resistance. This is illustrated in FIG. 23 (On the second page of the drawings). At the end remote from the end from which a cable 18 extends, a body 2 is formed with a central electrode 97 and a coaxial, cylindrical electrode 98, separated by an insulating sleeve 99 made from polyethylene. The electrodes 97 and 98 are connected with lead wires 83 and 84, respectively, contained in the cable 18. The remaining space in the interior of the body 2 is filled with epoxy resin 23. The body 2 and electrodes 97 and 98 are made flush, but preferably the central electrode 97 projects slightly to the exterior.

To this end face of the body 2 is applied a detector element 1, which as shown to an enlarged scale in FIG. 23A, is coated on its one surface with a conductive layer 100 which in turn contacts the electrodes 97 and 98. The conductive layer 100 may be formed by evaporation of aluminum, application or printing of a conductive paint, sputtering of metal or the like. The end of the body 2 adjacent its electrodes is fitted with a clamp sleeve 101 having a peripheral flange 102 which secures the element 1 against the body 2.

When the element 1 comes into contact with a liquid to be detected, it is dissolved. At the same time, the support for the conductive layer 100 is lost, so that it is removed by flow, rendering the path between the electrodes 97 and 98 non-conductive or a resistance determined by the resistivity of the liquid, thus providing a signal indicating the presence of that liquid. In an example, the element 1 was constituted by a polystyrene sheet having a diameter of 20 millimeters and a thickness of 60 microns, and aluminium was evaporated thereon to form the conductive layer 100. With this detector, an electrical interruption between the electrodes 97 and 98 occurred in 3 seconds for 100 percent styrene, demonstrating a rapid detection. When the electrode 97 projects slightly relative to the end face of the body 2 and the electrode 98, a good contact is achieved between these electrodes 97, 98 and the conductive layer 100.

As illustrated in FIG. 24 (located adjacent FIGS. 30A and 30B in the drawings), the element 1 may be formed on its one surface with a conductive layer 100 having electrodes 97 and 98 integrally formed on its opposite ends, and allowed to droop or depend in its intermediate portion so as to detect a liquid concerned. The element 1 with the conductive layer 100 can be manufactured in a large sheet, which can be slit to size for providing mass production.

As a further illustration of the use of a tape-like detector element having a conductive layer, FIG. 25 shows a detector element 1 applied along the outer surface of a column-shaped body 2, running around one end thereof and terminating at the opposite end of the body on opposite sides thereof. A cap 104 of an insulating material is fitted over this end of the body 2 including the ends of the element. A pair of resilient contacts 105 and 106 extend axially along the inner surface of the cap 104 and have a dimple formed therein intermediate its ends. The upper end of the body 2 is formed with a peripheral rib 107, and as the cap 104 is fitted thereon, the rib 107 resiliently engages the contacts 105 and 106 through interposed ends of the element 1. The contacts 105 and 106 are connected with terminals 58 and 59, respectively, mounted in the cap 104. It is seen that when the element 1 is dissolved to be broken, there occurs a change in the electrical resistance between the terminals 58 and 59.

FIGS. 26A and 26B illustrate a different manner of mounting a conductive tape used as a detector element. A body 2 is formed with a central bore in which an elongate piercing tool 108 having an edge at one end is mounted. A detector element 1 extends around the end face of the body 2 adjacent to the edge of the piercing tool 108, and over that end is fitted a cap 104, which is constructed as mentioned in connection with FIG. 25. The other end of the piercing tool 108 projects externally of the body 2, and the element 1 extends along the outer wall of the body 2 and also projects beyond this end thereof. A cap-shaped conductive connecting member 109 is fitted over the lower end of the body 2 from over the element 1. An internal projection 110 is formed in the member 109 and engages an annular groove 111 in the periphery of the body 2 to press the element 1 thereagainst as the member 109 is fitted, thereby electrically connecting the both free ends of the conductive layer 100 on the element 1 through the connecting member 109. Also, as the member 109 is fitted over the body 2, it urges the piercing tool 108 inwardly, which therefore cuts part the element 1 within the cap 104 with its edge (FIG. 26B).

FIG. 27 shows that a pair of relatively deep grooves 112 and 113 are cut in one end face of a body 2, and a pair of L-shaped levers 114 and 115 are pivotally mounted on one side wall of the body so as to make their respective one limb pivotable in and out of the respective grooves 112 and 113. A tape-like detector element 1 is adapted to have its both ends engaged by the levers 114 and 115 and inserted into the grooves 112 and 113, respectively, as the levers rotate. A terminal block 104 has mounted thereon a pair of conductive pinch members 105a, 105b adapted for resiliently holding the outer portion of the body 2 therebetween as the member 105b is inserted into the groove 112, and another pair of conductive pinch members 106a, 106b adapted for resiliently holding the other outer portion of the body 2 therebetween as the member 106b is inserted into the groove 113. The pair of members 105a, 105b are connected with a terminal 58, while the pair of members 106a, 106 b are connected with a terminal 59. The pinch members 105b and 106b may be adapted to hold therebetween the portion of the body 2 located between the grooves 112 and 113. In this manner, the pinch members 105 and 106 are electrically connected with a conductive layer 100 on the element 1. For properly guiding the element 1, a pair of shallow and relatively wide grooves 116 may be formed in the periphery of the body 2 to receive the element 1.

In the embodiments shown in FIGS. 25 to 27, means are disclosed which facilitates an electrical connection with a tape-like detector element simultaneously with the mounting of the latter. Alternatively, such a detector element may be unreeled from a supply. FIG. 28 illustrates such an arrangement. A body 2 comprises a relatively thick square plate of synthetic resin material, the body being formed with an integral extension 118 on its one side. Within the body 2 is housed a roll 119 of a tape-like element 1 having a conductive layer 100. At this end, near one corner, the square plate is formed with an opening 120 extending from one surface toward the other and a post 121 integrally formed with and extending vertically from the center of the bottom of the opening 120. A bobbin 122 having an inner diameter freely fitting over the post 121 is wound with the element 1 to provide the roll 119, which is then received within the opening 120. The element 1 is unreeled from the roll within the body 2 and extended around the extension 118. At this end, a tape passage 123 is formed in the body 2 to communicate with the opening 120 and run to the juncture between the body 2 and the extension 118. After extending around the free end of the extension 118, the element 1 extends along the opposite wall thereof to enter another tape passage 124 which is formed in the body 2 to follow substantially an inverted L-shaped path running from the juncture between the body 2 and the extension 118 to an intermediate area of another side of the body 2.

There are provided a first electrode 97 fitted in a recess (not designated) communicating with the passage 123 intermediate its ends and a second electrode 98 fitted in a similar recess communicating with the passage 124 intermediate its ends. On the side of the passage 123 remote from the electrode 97, a small hole 125 is formed in the body 2, extending to one side wall thereof, and is partially threaded for engagement with a screw 126 which acts through a coil spring 127 to urge an abutment piece 128 resiliently against the element 1. Thus, the element 1 is urged against the electrode 97, thereby achieving an electrical contact between the electrode 97 and the element 1. In a similar fashion, a small hole 129 is formed in the body 2 opposite to the electrode 98, threadably engaging a screw 130 and receiving a coil spring 131 and an abutment piece 132 for urging the element 1 against the electrode 98. The body 2 is recessed to receive a terminal board 133 and also slotted at 134 and 135 to receive lead wires extending between the respective electrodes 97, 98 and the terminal board 133. While not shown, a cover plate is detachably mounted on the major surface of the body 2 in which the opening 120, passages 123, 124 and the like are formed.

In the presence of a liquid to be detected, the element 1 around the extension 118 is immersed in the liquid, whereby it is dissolved to render the path between the electrodes 97 and 98 non-conductive. In view of the resilient urging by the abutment piece of the element 1 against 97, after the described detection, the element 1 remaining near the passage 123 can be manually withdrawn and extended around the extension, and subsequent to removal of the cover plate, inserted into the passage 124 by slightly depressing the abutment piece 132 against the resilience of the spring 131, whereupon the detector is again ready for operation. Thus repeated use is permitted until the element 1 on the roll 119 is exhausted. As an alternative arrangement, a pair of tape rolls may be housed in the body 2 to permit the respective elements to extend along opposite sides of the extension 118 and their free end clamped together against the latter by suitable means which also provides an electrical connection between these ends.

FIG. 29 shows, in exploded view, another embodiment using a conductive layer 100. A pair of sheet-like detector elements 1a and 1b having a conductive layer 100 on one surface of at least one element hold a pair of wire electrodes 97 and 98, carried by a support 136, sandwiched therebetween, and the assembly is fused together to provide an integral structure. The conductive layer 100 is disposed to short circuit the electrodes 97 and 98. When the element 1 is dissolved in a liquid to be detected, the conductive layer 100 formed thereon loses support therefor and hence is removed by flow. Thus the path between the electrodes 97 and 98 is rendered non-conductive or an increased electrical resistance, and a change of such electrical resistance provides a detection signal.

Instead of inserting the electrodes 97 and 98 between the detector elements as shown in FIG. 29, a thin conductive film 100 may be embedded in an element 1 as shown in FIGS. 30A and 30B, with the film being U-shaped and having its opposite ends connected with electrodes 97 and 98, respectively, formed by deposition on the outer surface of one end of the element 1. In addition to using deposition, the electrodes 97 and 98 may be constructed to be plug-in type or screwed-socket type, the latter being achieved by providing a post as at least part of the element and forming therein a threaded hollow cylinder electrode and a centrally positioned electrode.

Referring to FIG. 31, a pair of rod-shaped electrodes 97 and 98 extend through a detector element 1 of foamed synthetic resin in spaced apart relationship and are held thereby. The ends of the electrodes 97, 98 project slightly beyond one surface of the element 1 on which is formed a conductive layer 100 so as to short circuit these electrodes. The use of a protective sheath 33 prevents adhesion of algae, and also prevents malfunction with varying temperature if the element 1 comprises a material such as paraffin, rubber, wax or the like which is susceptible to deformation upon temperature variation.

To speed up the detection, bias means for promoting the deformation of the element 1 may be used. For example, FIG. 32 shows a cylindrical detector element 1 having a pair of axially extending, opposing conductive layers 100a and 100b formed on its inner surface. A body of an insulating material 2 is placed axially of the element 1 and is mechanically secured thereto at one end. At the other end, the element 1 carries a connecting member 109 which interconnects the conductive layers 100a and 100b. A coil spring 44 is placed between the body 2 and the connecting member 109. When an intermediate portion of the element 1 commences dissolution, the spring 44 serves rapidly sever it into upper and lower portions.

In an example using the arrangement of FIG. 32, the elements 1a and 1b were made of polystyrene, 60 micron tick and 10 millimeter long, evaporated with aluminum to a thickness of 500 A as conductive layers 100a and 100b. With a spring tension of 1 kg to the elements 1a, 1b, the assembly was placed into a water bath at 20°C on which was formed a styrene layer, 5 millimeter thick, as the liquid to be detected. The elements 1a, 1b were severed within a few seconds. Elements 1a, 1b of polyamide resin (Nylon 66) were prepared to the same thickness and width as above and biased with the same tension. When the elements were placed into an aqueous solution of 9.5 percent hydrochloric acid simulating a liquid to be detected, they were severed in 65 seconds.

Bias means may comprise a weight as illustrated in FIG. 33. A detector element 1 is secured at its one end to a side of a body 2 by means of screw 47a and carries a weight 47 at its other end. The element 1 is formed with a conductive layer 100, one end of which is connected with a terminal 58 on the body and the other end of which is connected to a terminal 59 through a lead wire 84. The element 1 may be in the form of a rod or tape. Where a conductive layer 100 is electrically and mechanically connected with a terminal or the like, it is secured in place by a screw and applied with a conductive paint, followed by moulding with epoxy resin, for example, for assuring electrically and mechanically stable connection. This also applies to the preceding embodiments. The use of a conductive layer 100 may be replaced by admixture with the element 1 of conductive particles such as silver, thus rendering the element 1 itself conductive.

The group of embodiments to follow is characterized by the resilience imparted to at least one of the electrodes to bias said one electrode, whereby upon occurrence of a change in the apparent specific gravity of the detector element, the bias is effective to turn off an electrical path in a mechanical manner. First referring to FIGS. 34A and 34B, there is shown an arrangement whereby a pair of electrodes 97 and 98 maintained in contact are removed from each other to detect the presence of a liquid to be detected. Specifically, the pair of electrodes 97 and 98 comprise a spring material and are held together by a support 136 at their one end. The resilience in the spring material is such as to deflect the electrodes away from each other. As shown in FIG. 34A, the electrodes are constrained in the position shown by a ring-shaped detector element 1 fitted therearound when they are pressed close and which is held in place by virture of the resilience of the electrode material. A thread-like conductive member 109 interconnects the free ends of the constrained electrodes 97 and 98. When the element 1 becomes dissolved, the resilience in the electrode material is great enough to sever the thread-like member 109. As seen in FIG. 34B.

In FIG. 35, a spherical detector element 1 of foamed synthetic resin material is formed with an aperture 138 in which is received an electrode subassembly comprising a pair of elastically deformed electrodes 97 and 98 held in the constrained position by a thread-like conductive member 109. The aperture 138 may be sealed with putty 139 to make the interior air-tight. Alternatively, only terminal portions of the electrodes 97, 98 including the thread-like conductive member 109 may be inserted into the aperture and held thereby.

In FIG. 36, a detector element 1 has a pair of grooves 140 and 141 formed in its one surface, and on this surface is formed a conductive layer, as connecting mean 109, coating and interconnecting the interior of these grooves. A pair of electrodes 97 and 98 held together at their one end by a support 136 have their free ends inserted into the grooves 140 and 141, respectively, in a constrained condition. In FIG. 37, an elongate groove 142 of the form interconnecting the pair of grooves such as shown at 140 and 141 in FIG. 36 is provided, and the free ends of the electrodes 97, 98, as wrapped by a conductive tape member 109, are inserted into the groove 142. When the element 1 becomes dissolved, the electrodes 97, 98 flare out on account of their resilience, breaking and dropping the member 109.

In FIG. 38, each of electrodes 97 and 98 has a contact 16, 17 attached to its free end in opposing relationship, and only such ends are inserted into an aperture 138 formed in a detector element 1 by pressing these ends close to each other against the resilience of the electrode material. As in FIG. 35, the whole assembly may be housed within the element 1. One of the electrodes 97, 98 may be rigid in nature.

In FIG. 39, no use is made of the resilience in the material for electrodes 97, 98, but the pair of electrodes 97 and 98 with their ends bridged and electrically interconnected by a rod-shaped conductive member 109 is entirely moulded in a detector element 1. When the latter becomes dissolved, the member 109 will drop. Where the element 1 comprises a material such as paraffin which is susceptible to deformation with varying temperature, it may be incorporated into a self-supporting structure such as meshwork 140, for example.

A detector cell which is constructed to have an increased electrical resistance when it is dissolved as exemplified in FIG. 39 is further illustrated in FIG. 40 in which a detector element 1 is in the form of a barrel closed at one end and internally houses a pair of rod-shaped electrodes 97 and 98 as well as a connection 109 therebetween comprising a conductive liquid or conductive particles. A threaded base 141 is mounted on the open end of the element 1 and is connected with the electrode 97, while the electrode 98 is connected with a contact 142 provided centrally in the base 141 and insulated therefrom. Upon dissolution of the element 1, the internally contained conductive liquid or particles are dispersed therefrom to render the electrodes 97 and 98 electrically insulated from each other. Alternately, the existence of a liquid to be detected across the electrodes 97, 98 increases the electrical resistance therebetween as compared with that prevailing before the dissolution occurs.

In FIG. 41, a sleeve-shaped detector element 1 contains a connection 109 comprising a conductive liquid or powder and is closed by a pair of electrodes 97 and 98 with respective leads 83 and 84 at opposite ends, which in turn are attached with spherical bodies 152, 153 for supplying the buoyancy to hold the element 1 floating on a body of liquid 25. Upon dissolution of the element 1, the conduction between the electrodes 97 and 98 is lost.

FIG. 42 shows the use of a metal block as the connection 109 which is held sandwiched between a pair of electrodes 97 and 98, and such a subassembly is housed with a barrerl-shaped detector element 1. Upon dissolution of the element 1, the connection 109 falls down. The subassembly mentioned above may be moulded with a material that constitutes the element 1.

As a further illustration, an arrangement may be employed in which a pair of electrodes are electrically insulated from each other, but are adapted to change the electrical resistance thereacross in response to an introduction of a liquid to be detected therebetween. This is illustrated in FIG. 43, where it will be noted that the assembly is generally similar to that shown in FIG. 41, but that the connection 109 shown in that Figure and comprising a liquid or particles is eliminated. Instead the space within a barrel-shaped detector element 1 is filled with an insulating gas or liquid, thus making the path between a pair of electrodes 97 and 98 normally non-conductive. However, upon dissolution of the element 1, the liquid 25 as well as a liquid to be detected 27 are introduced into the space therebetween. Thus the path changes from the electrically non-conductive condition to a condition in which it is conductive through the presence of the liquids 25 and 27, and such a change is detected by an external circuit. It is to be noted that this embodiment is restricted to those applications where the liquid 27 is conductive, provided such liquid 27 alone would be introduced. As an alternative, the element 1 may be solid, e.g., a rod, with the electrodes 97 and 98 embedded therein. In this instance, the element 1 way be formed of synthetic resin material, and the electrodes 97, 98 may be heated before insertion so that areas of the element 1 adjacent to the penetrating electrodes will melt somewhat, creating a hollow space in which to receive the electrodes. When a liquid to be detected 27 such as oil floating on the liquid 25 reaches the element 1, only that intermediate portion of the latter which comes in contact with the liquid 27 will be dissolved, dividing the element 1 into two parts, upper and lower ones, of which the lower will sink into the liquid 25. As a result, the liquid 25 is introduced into the space between the electrodes 97 and 98 to connect them electrically through the liquid 25.

Each of the electrodes 97 and 98 may be inserted into an individual detector element, and the pair of elements thus formed held together at their one end by a support in closely spaced parallel relationship. In FIG. 44, elements 1a and 1b are thin barrels, in which electrodes 97 and 98 are loosely fitted, respectively. The lower end of the elements 1a, 1b may be left open, since the electrodes 97 and 98 are interconnected only by a liquid 25 of reduced area at this end and the electrical resistance thereacross remains high. On the other hand, when the elements 1a, 1b come into contact with a liquid to be detected and dissolved in their intermediate portion, allowing their lower portions to sink, there is a sufficient opposing area on the electrodes to reduce the electrical resistance thereacross, thus providing an indication of the presence of the liquid to be detected. The electrodes 97 and 98 may be cylindrical in shape to increase their opposing area. The upper ends of the elements are closed by a cap on support 136.

Where a material such as paraffin, rubber or the like which is susceptible to deformation with varying temperature is used for a detector element, it may be incorporated in a vessel or structure such as meshwork 140 which permits penetration of the liquid concerned, as shown in FIG. 45. In this instance, the vessel 140 is used as one of the electrodes, 98, and the other electrode 97 is inserted into a detector element 1.

In FIG. 46, a cylindrical electrode 98 is used in which is formed a number of distributed small openings 144, and a cylindrical electrode 97 is arranged inside the electrode 98 in coaxial relationship. To the inner and outer peripheral surfaces of the electrode 98 are applied detector elements 1a and 1b in the form of a deposited film. Upon dissolution of the elements 1a, 1b into a liquid to be detected, conduction is established across the pair of opposing electrodes 97 and 98. The end of the both electrodes which is immersed into a liquid may be closed by a plate 145 or may be left open. In case this end is left open, there may be a certain amount of leakage current (assuming the electrodes are connected across a voltage source) before the dissolution of the elements takes place. Where either element 1a or 1b on the inner or outer surface of the electrode 98 is omitted, the plate 145 should be used, and if the element is of electrically insulating nature, the plate 145 may be made from the same material as the element.

Referring to FIG. 47, a detector element 1 is in the form of a balloon, and a pair of electrodes 97 and 98 are mounted therein. The buoyancy of the element 1 itself is utilized to float it on a liquid level 25. Applying a suitable internal pressure to the element 1 provides an advantage of facilitating perforating it when it comes into contact with a liquid to be detected. A material which becomes softened by contact with a liquid to be detected, for example, a film of rubber as against hexane, may be used for the element 1 to help in breaking it with the internal pressure upon the occurrence of the softening. Alternatively, the element 1 may comprise a block of foamed synthetic resin in which the electrodes 97 and 98 are embedded to make it float on a liquid.

For an assembly which utilizes the intrusion of a liquid upon dissolution of a detector element constructed as a film, an arrangement may be made to impart buoyancy to a float upon intrusion of the liquid. FIG. 48 (located adjacent FIG. 60) illustrates one embodiment of this kind. A body 2 has a bottom extension which is screwed into a guide cylinder 29 for securement thereof with the body 2. The guide cylinder 29 has a bottom plate on which is disposed a float 145 having a support rod 46 extending vertically therefrom and carrying a permanent magnet 31 at its top. A part of the body 2 screwed into the guide cylinder 29 includes an aperture 147, in and out of which the magnet 31 can be moved. The topmost portion of the magnet 31 is received within the aperture 147, and a reed switch 14 is housed within the body 2 at a position opposite the magnet 31.

The guide cylinder 29 has distributed small openings 144 formed therein. To the outer peripheral surface of the guide cylinder 29 is applied a detector element 1 in the form of a film, thereby occluding the openings 144. Upon dissolution of the element in a liquid to be detected, the liquid makes ingress into the guide cylinder 29 through the openings 144, causing the float 145 to float, whereupon the magnet 31 moves into the aperture 147 to come directly opposite to the reed switch 14 to turn it on.

In FIG. 49, a body 2 is connected with a hollow body 148 which is juxtaposed with the body 2. The hollow body 148 is formed with distributed small openigns 144 which are normally occluded by a detector element 1 in the form of a film. A mercury switch 14 is housed within the body 2, and the assembly is floating on a liquid 25 in the illustrated state. When the element 1 becomes dissolved in a liquid to be detected, the liquid is admitted into the hollow body 148 which therefore becomes heavier, and the assembly is tilted with the body raised with respect to the hollow body 148 which then sinks, thus operating the switch 14. The assembly comprising the body and the hollow body is shaped to resemble a marine vessel to assure good stability against waves.

FIG. 50 shows a further embodiment in which a pair of semi-cylindrical bodies 149 and 150 are joined together at their diammetrical planes and are secured together by means of a detector element 1 which may be in the form of a tape or plate and which are mounted on the both end faces of the composite cylindrical body extending across the both semi-cylindrical bodies. A permanent magnet (not shown) is housed within the upper semi-cylindrical body 149 while a reed switch (not shown) is housed within the lower semi-cylindrical body 150 so as to be opposite to the magnet, and the assembly is adjusted so as to cause the joining plane to assume an inclined position as shown. Upon dissolution of the element 1 in a liquid to be detected, the semi-cylindrical body 149 becomes free to fall, whereby the reed switch is turned off.

FIG. 51 shows a U-shaped frame 81 with the ends of its limbs bridged by a sheet-like detector element 1. A switch 14 is mounted on the frame 81, lying opposite to the element 1. A movable body 151 is interposed between the element 1 and a lever 55 pivotally mounted on the switch 14. Normally the lever 55 is urged into abutment with the operating lug 56 of the switch, which lug is thus depressed. When the element 1 becomes dissolved or softened, the lever 55 is free to rotate counter-clockwise, thereby allowing the lug 56 to be released.

In the foregoing description, it is contemplated that the liquid detector is used by floating it on a liquid in the sea, river or drainage. Where sufficient buoyancy is not available from the detector itself, it may be used in combination with a suitable float.

Referring to the several following Figures, liquid detectors applicable to the watching service of a pipeline will be described. Referring to FIG. 52, numeral 154 denotes a pipeline, and a detector element 1 is mounted lengthwise thereof in direct contact with the outer periphery thereof. The element 1 is adapted to be dissolved upon contact with the liquid flowing through the pipeline 154, and may comprise polyisoprene or polystyrene when petroleum or styrene, respectively, is carried through the pipeline. The element 1 has a conductive layer 100, which may be formed by evaporation of aluminium, and the composite element is applied to the pipeline. Where the pipeline is made of a metal, the conductive layer 100 is disposed to be outermost. In this manner, a path is formed by the conductive layer 100 from one end to the other end of the pipeline.

If cracks occur in the pipeline 154 to cause a leakage of the liquid flowing therethrough, that area of the element 1 which comes into contact with the liquid becomes dissolved, with consequence the corresponding portion of the conductive layer 100 is also removed because of the loss of the support therefor, thereby interrupting an electrical path including the conductive layer 100. Thereupon, a detection is obtained indicating the fact that a leakage occured in the pipeline 154. It is also possible to locate the leakage position along the length of the pipeline 154 by transmitting a pulse from one end of the conductive layer 100 and measuring the length of time it takes until a reflected wave from the point of interruption is received.

In FIG. 53, a detector element 1 is attached with a protective strip 155 of a flexible insulating material such as vinyl chloride and which is in direct contact with a conductive band 100, and the strip is mounted on a pipeline 154 with the element 1 as the innermost layer. The presence of the protective strip is effective to prevent destruction of the element 1 as well as degradation of the conductive layer 100 for an underground pipeline 154.

In FIG. 54, a pair of self-supporting tape-like electrodes 97 and 98 are overlaid on opposite surfaces of a detector element 1 which may be a relatively thin web of foamed polystyrene, and are resiliently held against the element 1 by open-ring leaf springs 156 disposed at a suitable spacing along the length of the element 1. This detector assembly is installed along a pipeline. (In several Figures to follow, only the detector is shown, but it is associated with a pipeline.) When the element 1 becomes dissolved in a liquid which leaked from the pipeline 154, the resilience of the spring 156 causes the electrodes 97 and 98 to be brought into contact with each other. In FIG. 55, electrodes 97 and 98 are constituted by wires coated by separate detector elements 1a and 1b, respectively, which are resiliently held together by springs 156.

Referring now to FIG. 56A, there is provided a cylindrical detector element 1 in which is coaxially arranged an electrode 97 in the form of a coiled spring, and a linear electrode 98 is supported, by suitable means, at the axis of the coiled spring. Upon dissolution of the element 1 (see FIG. 56B), a torsional effect previously applied to the electrode 97 causes it to deflect into contact with the electrode 98.

In FIG. 57A, a detector element 1 is cylindrical in shape and formed of foamed synthetic resin material. A tape-like electrode 97 is wrapped around the outer periphery of the element 1 in a helical form, and a substantially linear electrode 98 of flexible material is held located on the axis of the element 1 with a small excursion of zig-zag form, but without contacting the outer electrode 97. If required, the electrode 97 may be coated with a protective film 1' of the some material as used for the element 1. Upon occurrence of effluence from a pipeline, the protective film 1' and the element 1 become dissolved, whereby the electrode 98 sags or droops down into contact with the electrode 97, as illustrated in FIG. 57B.

In FIG. 58, a similar arrangement is used as in FIG. 57 with the exception that conductive weights 47 are passed over the central electrode 98 at a suitable spacing, so that upon dissolution of the element 1, the weights 47 fall down to contact the electrode 97. The detector elements of the above described several embodiments can be disposed along the pipeline from end to end, or alternatively, the pipeline may be divided into sections along its length and a single detector element 1 disposed along each section. The detector shown in FIG. 16 may be modified by using a linear element 1, which is disposed along the pipeline. The support frame 81 shown in that Figure may be replaced by a tube of protective material which permits penetration of the liquid conveyed through the pipeline or by a protective tube comprising a meshwork coated with the protective material. One end of the linear detector element 1 is secured to one end of the tube, while the other end of the element is connected with the other end of the tube with a conductive coil spring 46 interposed therebetween. A detector thus constructed may be located at suitable sites lengthwise of the pipeline. Suitable chemicals may be applied to or mixed with the element 1 to prevent attack by rat or termite.

With reference to FIG. 59, one means for determining the position of any leakage site along a pipeline using any of above described various liquid detectors arranged therealong will now be described. A plurlaity of liquid detectors are sequentially arranged along a pipeline, and each of the detectors is associated with a unit 158a, 158b, 158c, which are located on the same site as the corresponding detectors. These units are identical in construction, and each comprises a delay circuit 159, reverse-flow preventing diode 160 to which the output from the delay is fed, a liquid detector 161 located in a particular site, and a network 162 forming a logical product of the outputs from the delay 159 and the detector 161. A pair of leads 163 and 164 run along the pipeline. When a switch 165 is turned on in a watch station of the pipeline, a pulse from a power supply 166 is applied to the delay circuit 159 of the nearest unit 158a, and is applied, after a given time delay, to the lead 163 through the diode 160 and also to the logical AND circuit 162 and the detector 161. If the pipeline is free from leakage at that site, the detector 161 remains on electrically, so that the pulse applied thereto is fed to the AND circuit 162, which therefore produces an output to the lead 164. The leads 163 and 164 are connected with an exclusive OR circuit 167. As known, an exclusive OR circuit provides "0" output when the two inputs are alike and provides "1" output when the inputs are unlike. In the present instance in which it is assumed that there occurred no leakage at the site corresponding to the unit 158a, the circuit 167 receives pulses on both leads 163 and 164 and hence produces 0 output.

One end of the lead 164 is also connected with a recorder 168 and a counter 169. When the switch 165 is turned on, the recorder 168 is activated and the counter 169 is reset. After passing through the unit 158a, the pulse is applied through a line 170 to the delay circuit 159 of the next nearest unit 158b. If again no leakage occurs from the pipeline at this site, the circuit 167 produces 0 output, and accordingly, the recorder 168 records the return of the pulse and the counter 169 now contains a count of two. In this manner, the output of successive units 158 is sequentially examined. If there is a leakage from the pipeline at a particular site, the detector at that site is turned off, so that there is no output from the AND circuit 162 of the corresponding unit. As a consequence, the circuit 167 produces 1 output, which may be used to drive an alarm 171. There is no pulse returned to the recorder 168, which therefore records no pulse, so that by noting the position in time at which a record of pulse is lacking, it can be determined which detector 161 failed to send back a pulse, and thus the occurrence of a leakage at a portion of the pipeline corresponding to the site of that detector is detected. Alternatively, the leakage site can also be located by using the conductive layer or electrode in a detector element 1 disposed along the pipeline as part of elements which determine the oscillation frequency of an oscillator and causing a change in the oscillation frequency when the conductive layer is broken or the electrode is short-circuited.

While the preceding description has been primarily directed to the dissolution and an increase in the weight of the detector element which occur as a change in the apparent specific gravity thereof, it is also possible to detect a change in the apparent specific gravity which takes the form of a softening of the detector element upon its contact with a liquid to be detected. An example is shown in FIG. 60 wherein a first electrode 97 of the combined shape of a sphere and an integral cone therebelow is embedded within a detector element 1, but is biased downward by virtue of its own weight. The element 1 is contained in a vessel such as meshwork vessel 140 into which a liquid can penetrate. Directly below the first electrode 97, a second electrode 98 is placed on the bottom plate of the vessel. These electrodes 97 and 98 are connected with a plug 137 through lead wires 83 and 84, respectively. When a liquid to be detected penetrates into the vessel 140, the element 1 becomes softened, allowing the embedded electrode 97 to fall, by gravity, into contact with the electrode 98. Because of the pointed shape of the lower extremity of the electrode, the fall of the electrode 97 upon softening of the element 1 is accelerated, achieving a detection in a short time interval. Materials adapted to become softened by contact with the liquid to be detected include paraffin, wax, rubber and the like, and while these materials are susceptible also to deformation with varying temperature, the malfunction due to temperature variation is prevented by the presence of the vessel 140.

When the meshwork vessel 140 containing the element 1 is made conical with its apex directed down and the electrode 97 is in the form of a sphere, as shown in FIG. 61, an improved reliability is obtained in operating an electrical circuit connected therewith, by virtue of the increased area of contact between the electrodes as the electrode 97 falls into contact with the other electrode 98 which is constituted by the vessel. FIG. 62 shows the use of a spring to bias an electrode. Specifically, the electrode 97 is embedded in a detector element 1, from which extends a rod shaft 43 horizontally to the exterior thereof. The free end of the rod shaft 43 carries an abutment 173, and a coil spring 46 extends around the guide rod 175 between the abutment 173 and an opposing stationary support 174, thereby urging the abutment 173 and hence the electrode 97 toward the other electrode 98.

In FIGS. 60 to 62, the element 1 may be one that is dissolved upon contact with a liquid to be detected.

FIG. 63 shows another embodiment of a detector element which becomes softened upon contact with a liquid to be detected. A base 87 is provided with a pair of parallel ribs 176 and 177 on its top surface, and a sheet-like detector element 1 is placed across the ribs. The element 1 is of the variety becoming softened upon contact with aa liquid to be detected, and may comprise paraffin or rubber when the liquid is hexane, and vinyl chloride when the liquid is acetone. A needle 178 extends vertically into contact with the central region of the element 1 so as to produce a displacement signal upon softening of the element. At this end, an inverted L-shaped bracket 179 is integrally formed with the base 87 and is formed with a small perforation 180 therein for loosely fitting the needle 178 to allow it to bear against the element 1. In order to increase the amount of displacement of the needle 178 upon softening or to speed up the detection, a weight 47 may be attached with the needle 178 intermediate the bracket 179 and the base 87.

Signal generating means comprise a laterally extending arm 181 secured to the bottom surface of the weight 47 and having its free end located immediately above the operating lug 56 of a microswitch 14 mounted on the vertical wall of the bracket 179. When the element 1 comes into contact with a liquid to be detected and becomes softened, the needle 178 undergoes a downward displacement, thereby operating the microswitch with the arm 181. The weight 47 may be replaced by a coil spring which urges the needle 178 toward the element 1. Alternatively, the sheet of the element 1 may be made thin enough to be pierced by the needle 178 upon softening of the element so as to permit the needle 178 which is then constructed as one of the electrodes to move into contact with another electrode arranged intermediate the element 1 and the base 87 for producing a signal.

An arrangement may also be made for a detector element to shrink upon contact with a liquid to be detected so as to cause a change in the apparent specific gravity thereof. FIG. 64 illustrates such an embodiment wherein a detector element 1 comprises a sheet of methyl methacrylate (MMA). A pair of mounts 182 and 183 are attached to its opposite ends, as required, and the sheet including the mounts is held tensioned across the vertically extending limbs of a U-shaped support 81 by means of a coil spring 46. When the element 1 comes into contact with a liquid to be detected and shrinks, because the mount 182 remains stationary with respect to its adjacent limb, the mount 183 is pulled toward the mount 182 against the resilience of the spring 46. Such a movement is effective to operate a microswitch 14 mounted on the base of the support 81 through the arm 181.

In FIG. 65, a pair of elongate plate-shaped electrodes 97 and 98 of relatively flexible material are held in opposing relationship with a pair of insulating spacers 184 and 185 interposed therebetween. To assemble the electrodes integrally, a detector element 1 in the form of a thread or cord is tightly wrapped around the both electrodes intermediate the opposite spacers 184 and 185. A pair of contacts 16, 17 are mounted on the opposing surfaces of the electrodes 97 and 98, respectively, intermediate the spacers 184 and 185, so as to be closely spaced and opposite. When the element 1 comes into contact with a liquid to be detected and shrinks, the wrapping is tightened to deflect the electrodes 97 and 98 to bring the contacts 16 and 17 into contact.

Additionally, an arrangement can be made for the dtector element to shink and become hardened upon contact with a liquid to be detected so as to cause a change in the apparent specific gravity thereof. This is illustrated in FIG. 66 wherein a detector element 1 comprises methyl methacrylate which becomes hardened upon contact with acetonitrile. The element 1 is secured to an anchorage 174 at one end and carries a movable body 186 at the other end. Normally the element 1 is in a deflected condition. This may be achieved by pivotally connecting the movable body 186 with one end of a crank shaft 187, the other end of which is pivotally connected with one end of a crank arm 188. The other end of the crank arm 188 is fixedly mounted on a rotary shaft 191 that is driven into rotation by a motor 189 through a transmission belt 190. Thus the crank shaft 187 is driven by the motor 189 and in turn drives the movable body 186 for reciprocation in a direction normal to the plane of the sheet-like element 1, thus normally subjecting the sheet element 1 to deflection.

A microswitch 14 is arranged on one side of the reciprocating body 186 with its operating lug 56 positioned to be repeatedly depressed by the movable body 186. Thus the switch alternately turns on and off. Upon contact with a liquid to be detected, the element 1 becomes hardened. the hardening results in an increased load on the motor 189, eventually causing the belt 190 to slip and thus the movable body 186 ceasing to reciprocate, thereby preventing the on-and-off operation of the switch 14. Alternatively, the detection may be performed by monitoring an increase in the load current of the motor 189 when the element 1 becomes hardened and the movable body 186 presents an increased resistance to motion.

While in the foregoing description, the signal generating means produced either electrical or mechanical signals, it can be used to produce a fluidic signal. This is illustrated in FIG. 67. In this FIGURE. a flapper 192 is arranged within a casing 45 and is biased by a weak spring 46 for pivotting motion. a pilot valve 193 has its nozzle 194 located opposite the flapper 192 and is fed with a pneumatic pressure from a pipe 195, the valve being also connected with an exhaust pipe 196. A body 2 is secured to the bottom of the casing 45, and a tape-like detector element 1 secured at one end to the free end of the flapper 192 extends through an opening in the bottom of the casing and around the length of the body 2 to be anchored at its other end to the latter. The element 1 is tensioned by a weight 47 suspended from the bottom of the body 2 by a coil spring 44, thereby urging the flapper 192 away from the nozzle 194. It is seen that under the condition described, the output pressure from the pipe 195 remains low. However, when the element 1 is broken, the flapper 192 is pulled up against the nozzle 194 by the spring 46, so that the output pressure from the pipe 195 increases.

Various kinds of liquid detectors described above are located where the effluence of a dangerous liquid is expected in a facility such as a big scale chemical plant, for example, and the signals, for example, electrical signals, from the distributed detectors are monitored at a single station in a concentrated manner. However, where small chemical plants such as electroplating plants are dispersed throughout a relatively extensive district, a concentrated monitoring of drain from these plants may involve difficulties in respect of the signal transmission equipment to the monitoring station. In that situation, it is contemplated that a watchman makes the round to check the liquid detectors from plant to plant. It is readily understood that the occurrence of a signal must be stored. By way of illustration, individual inlets to a main drainage from various sections of a plant have respective liquid detectors associated therewith. In order to secure the reliability of the information contained in the respective detectors os that the data collected is useful to the investigation of the cause of accidents occurred, the respective liquid detectors will be contained in a locked casing to make them tamper-proof. In these circumstances, it is convenient if the operative condition of the liquid detector could be immediately sensed from outside the locked casing. In view of such consideration, the invention also provides storage means enabling a signal generated to be stored in a condition which facilitates its read-out.

FIG. 68 illustrates one embodiment of such storage means. A liquid detector 161 is laid floating on a liquid 25 in a drainage or the like by using a float 197. The detector includes a casing 198 of non-magnetic material having its periphery perforated at 34 for allowing the liquid 25 to penetrate into the casing 198. The upper space 199 in the casing communicates with a longitudinal bore 200 formed in the casing, and the bottom plate of the casing is also perforated at 34'. The element 1 is disposed within the upper space 199.

The element 1 is in the form of a relatively thin block and formed with a central opening in which a permanent magnet 31 contained in an envelope 201 of non-magnetic, thin material is fitted to be secured. The upper end face of the magnet 31 is spaced closely from the top wall 198a of the casing 198.

Hence, in the normal position shown, the flux from the magnet 31 can be sensed by a magnetic sensor 202 as it is moved nearer the top plate 198a. However, when a liquid to be detected comes into contact with the element 1, the latter becomes dissolved and the envelope 201 is freed from constraint by the element 1 to sink as indicated by an arrow. This movement constitutes the generation of a mechanical signal. As the magnetic sensor 202 is moved close to the top wall 198a, the flux sensed thereby at this relative position is low enough to permit a detectable output. Once the magnet 31 is released, or the signal generated, this condition is retained or stored. The stored content can be read out later by the magnetic sensor 202. The present embodiment is characterized by the storage of the signal as a mechanical position and by the signal generating means which also serves as part of storage means, where it is desired to derive an electrical signal indicative of the condition of the detector 161, a reed switch 14 may be located in alignment with the lower end of the longitudinal bore 200 so as to be actuated when the magnet 31 falls down.

FIG. 69 shows another embodiment of the storage means for a signal generated. A horizontal rotary shaft 86 is rotatably journalled within a casing 198, and fixedly mounts a rotatable body comprising a weight 47 and a detector element 1, each of which constitutes the lower and upper half of the body, respectively. As seen, normally the weight 47 assumes the lower position, while the element 1 is assumes the upper position. The element 1 of the kind which an increase in its weight causes a change in the apparent specific gravity thereof, while the weight 47 has a relatively small specific gravity on the order of 1.0 to 1.2. On top of the element 1 is fixed a permanent magnet 31, which lies closely opposite to the top wall 198a of the casing 198 when the element 1 assumes the upper position. When a liquid to be detected enters the casing 198 through perforations 34, the element 1 increases its weight sufficiently to cause it to assume the lower position. As a result, when a magnetic sensor 202 is moved close to the top wall 198a, no output is obtained therefrom. As an alternative, a reed switch 14 may be received in the bottom wall of the casing 198 so as to be operated when the magnet 31 rotates to its lower positon.

The invention also provides means whereby the liquid to be detected can be sampled and stored upon occurrence of a change in the apparent specific gravity of the detector element. This means is illustrated in FIG. 70 wherein a casing 198 is divided by a partition 203 into upper and lower chambers. The peripheral wall of the upper chamber 199 is formed with small openings 34 distributed all around it, and is internally applied with a sheet-like detector element 1, which normally covers the openings 34. The partition 203 is centrally formed with an opening 204, which opposes a valve 205 placed on the underside of the partition 203. Thus the opening 204 can be blocked by the valve 205. A float 145 is housed within the lower chamber 199a of the casing 198 and a supporting rod 146 extends vertically from the float 145 to mount the valve 205 at its top end. A guide sleeve 206 is integrally formed with the underside of the partition 203 for guiding the valve 205 around the opening 204. The guide sleeve 206 is peripherally formed with small openings 207. To stabilize the casing 198 with the lower chamber containing the float 145 situated down, a weight 47 is fixed to the bottom surface of the casing 198.

when a liquid to be detected comes into contact with the element 1, it is dissolved, allowing the entry of the liquid into the casing 198 through the openings 34. The liquid then flows into the lower chamber 199a through the opening 204, gradually filling this chamber, whereby the float 145 floats on the liquid to cause the valve 205 to block the opening 204. Thus the liquid to be detected which is present at the time the element is dissolved is sampled and stored in the lower chamber of the casing 198 for later removal and analysis. The upward motion of the valve 205 constitutes a mechanical signal, which initiates the sampling operation.

FIG. 71 shows a further embodiment of the sampling means. A casing 198 includes a top plate which is constituted by a detector element 1. A support rod 146 for a valve 205 extends upwardly from the tapered end of the valve and carries an abutment member 208 at its top end. The other end of the support rod 146 extends into a cylinder 209 and carries a piston 210 at its extremity, the cylinder 209 being formed in the lower chamber of the casing 198. A coil spring 44 extends between the piston 210 and the end plate of the cylinder 209 remote from the piston, and urges the abutment member 208 against the element 1. In the condition described, the valve 205 is removed away from the opening 204.

When the element 1 comes into contact with a liquid to be detected and becomes dissolved, the liquid is free to flow into the lower chamber through the opening 204, and the air present within the cylinder 209 is gradually displaced therefrom through a small hole 211 formed in the side wall of the cylinder, so that the piston 210, being urged by the spring 44, gradually moves upward to cause the valve 205 to block the opening 204 after aa required quantity of the liquid is received and stored in the lower chamber of the casing 198. The element 1 is applied in an inclined plane to ensure that the liquid level lies intermediate its ends, irrespective of some manufacturing tolerances. A cover 212 may be pivotally mounted and locked to the casing 198 to prevent the internal condition from sight, the cover 212 being permeable to the liquid.

FIG. 72 shows an arrangement for transmitting a sound wave in response to a signal from the signal generating means. A source of pneumatic pressure such as a pressure reservoir 213 has its outlet connected with a pipe 214, which has an ear 215 mounted thereon, to which is inturn pivotally mounted a pivotable arm 216. A detector element 1 having a weight 47 attached to its lower end is suspended from the other end of the arm 216. The pipe 214 is connected with a valve unit 217 including a valve 205 which is connected with a support rod 146, the rod 146 extending to the exterior of the unit 217 and having its outer end pivotally connected with the arm 216. Normally, the weight 47 biases the arm 216 downward, thereby causing the valve 205 to be seated in its valve seat 204. However, when the element 1 comes into contact with a liquid to be detected and becomes dissolved to be broken, the spring 44 urges the arm 216 upward to move the valve 205 away from the valve seat 204, thereby opening the unit 217. As a result, compressed air is discharged from the reservoir 213 to drive a sound emitting unit 218 such as steam whistle or siren. The units 218 associated with respective liquid detectors may have differing frequencies of sound, so that the tone emitted by a particular detector can be effective to determine the location of that detector. It is to be understood that the valve unit 217 may be controlled by a number of arrangements described above, including both the direct motion of the detector element and the motion of a driving body.

It will be seen that in the embodiment of FIG. 72, a change in the apparent specific gravity of the element caused a mechanical signal to be produced, which in turn initiated the transmission of a sound wave. The mechanical signal can be additionally used to initiate automatically the scattering of extinguishment. At this end, the pipe connection from the valve unit 217 is branched to an extinguishant reservoir 219, as further shown in FIG. 72, and when the valve unit 217 opens, the compressed air is blown into the reservoir 219 to effect the scattering of oil adsorbent powder or the spraying of oil neutralizing emulsifier through outlet 220 to accommodate for the leakage of the liquid to be detected. Instead of spraying of extinguishant, a fire extinguisher may be operated. This may be readily achieved by connecting the arm with an operating lever of the extinguisher.

Finally an arrangement may also be made to operate a siren or the like without recourse to the source of pressurized air 213 and valve unit 217, by causing a change in the apparent specific gravity of the detector element to produce a mechanical signal which initiates the blending of two different liquids to produce a gas by the chamical reaction between them for actuating the siren.

FIG. 73 shows a further embodiment for transmission of a sound wave in response to the generation of a signal. Within a casing 198 is formed a guide channel 221, across which is bridged a plate-shaped detector element 1, on which is placed a ball 222. The casing is perforated with small openings 34 adjacent to the element 1. Any liquid leaking from a pipeline 154 will enter the casing through the small openings 34, and upon contact with the element 1, cause it to be dissolved, whereupon the ball 222 will be guided by the channel 221 to drop onto a dish-shaped end of a pivotable arm 223. The arm 223 then rotates counterclockwise, as viewed in this figure, about its pivot which is mounted on the casing bottom, whereby the other end of the arm 223 is disengaged from a detent formed between this end and the lower end of a hammer 225. The hammer 225 is biased clockwise, as viewed in this FIGURE, by a spring 226 which has its other end secured to the casing wall. Thus the hammer rotates clockwise to strike a tuning fork 227. The sound emitted by the fork 227 is transmitted along the pipeline 154 to be received by an acoustic sensor 228 located suitably along the pipeline.

By preparing tuning forks having different resonant frequencies and locating them along the pipeline, the leakage site can be located. Where the pipeline 154 is not a rigid body, the sound wave generated may be propagated along a separate rigid body installed along the piepline. Alternatively, the sound generated by the fork 227 may operate on an electrical oscillator which is associated with a wire or wireless relaying system.

Having described the invention, what is claimed is:
1. A liquid detector comprising:
   a. a detector element comprising a material which dissolves upon contact with a liquid to be detected;
   b. means for generating a signal upon the breaking of the detector element due to the dissolution thereof;
   c. means for holding the detector element at an end; and
   d. bias means for applying a biasing force to another end of the detector element to hasten the breaking thereof upon dissolution and accelerate the operation of said signal generating means.

2. A liquid detector according to claim 1, in which the detector element is an elongated member and the biasing force produces a longitudinal tension therein.

3. A liquid detector according to claim 1 wherein said bias means comprises a driving body for undergoing motion in response to the breaking of the detector element, the motion of the driving body being effective to operate the signal generating means.

4. A liquid detector according to claim 1, in which the signal generating means includes a support member, and a pair of electrodes within said support member, each having one end extending out of an end surface of said support member; and the detector element comprises a conductive film-shaped member disposed in contact with said electrode ends and acting to short-circuit them; and the bias means comprises clamping means on said support for holding the detector element tautly between said electrodes.

5. A liquid detector according to claim 1, in which the signal generating means includes a pair of electrodes connected with each other by an electrical path through the detector element, the resistance of which path is directly varied in accordance with the dissolution of the detector element.

6. A liquid detector according to claim 4, in which said film-shaped member comprises a circular disc and said clamping means grips said disc about its periphery.

7. A liquid detector according to claim 1, in which the detector element is in the form of a film which becomes dissolved upon contact with a liquid to be detected.

8. A liquid detector according to claim 1, further comprising fluid transmission means and in which the signal generating means becomes operative to produce a mechanical signal in response to the severing of the detector element, said mechanical signal being conveyed to said fluid transmission means.

9. A liquid detector according to claim 1, wherein said means for holding an end of said detector element comprises support means for suspending said detector element therefrom and wherein said bias means comprises a weight attached to the lower end of the detector element.

10. A liquid detector according to claim 1 in which the signal generating means comprises a drive member adapted to be displaced under the action of the bias means in response to the dissolution of the detector element, and further comprising means driven by a displacement of the drive member for converting the displacement into a flow of liquid.

11. A liquid detector according to claim 1, further comprising a liquid conduction pipeline section and in which the detector element is disposed along said pipeline section through which the liquid to be detected is conveyed.

12. A liquid detector according to claim 11, in which the signal generating means comprises means for producing an electrical signal in response to the dissolution of any portion of the detector element by a liquid leaking from the pipeline section and further including means responsive to said electrical signal at a monitoring station for determining the position of the leakage site.

13. A liquid detector according to claim 1, in which the detector element is in the form of a film and the bias means causes a tension therein.

14. A liquid detector according to claim 1, in which the detector element is formed of a roll of material and further comprising means defining a path for supplying a length of detector element from the roll to a detector station which may be subjected to said liquid to be detected, and means for securing the length of detector element supplied to said station.

15. A liquid detector according to claim 1, further including a vessel containing a liquid which is to be detected by the dissolution of the detector element and means for blocking egress of the liquid from the vessel after it has been introduced into the vessel.

16. A liquid detector according to claim 1, in which the bias means is connected to the detector element in such manner that the element is previously stretched thereby to increase the speed of breakage and thereby the speed at which the liquid is detected.

17. A liquid detector according to claim 1, wherein said bias means comprises a spring attached to the detector element.

18. A liquid detector according to claim 1, in which the signal generating means comprises a drive member adapted to be moved in response to dissolution of the detector element, and electrical contact means controlled by a movement of the drive member.

19. A liquid detector according to claim 1, further including a porous protective sheath disposed around the detector element, said sheath preventing deposition of contaminants thereon while permitting the passage of a liquid therethrough.

20. A liquid detector according to claim 1, in which the detector element is formed with a thin layer of metal thereon which collapses upon the dissolution and breaking of the detector element.

21. Method of detecting the presence of a selected liquid comprising the steps of:
   a. disposing a material in the path of said liquid;
   b. selecting the material such that it will dissolve in response to contact with said liquid;
   c. sensing the breaking of said material due to dissolution;
   d. holding an end of said material and imposing a bias force on another end of said material to hasten the breaking thereof upon dissolution; and
   e. providing a signal in response to the sensing of said breaking.

22. A method as in claim 21 wherein the material is in the form of a film and the bias force acts to tension said film.

23. Method as in claim 21 wherein said material is electrically conductive and formed as a film which dissolves upon contact with said liquid.

24. Method as in claim 21, wherein said material is in the form of a porous film.

25. Method as in claim 21 wherein said material is in the form of a pendulous suspension and dissolvable in said liquid.

26. Method as in claim 21 wherein said path is a pipeline for conducting said liquid and said material is in the form of an elongated strip disposed there along.

27. Method as in claim 21 wherein the signal is in the form of a fluidic signal.

28. Method as in claim 21, wherein said material is an elongated member and longitudinally prestressed to accelerate its breaking.

29. Method as in claim 21 further comprising the step of storing part of the liquid which comes in contact with said material.

30. Method as in claim 21 wherein said signal is provided by the operation of a microswitch.

* * * * *